United States Patent
Sunaga

(10) Patent No.: US 7,182,466 B2
(45) Date of Patent: Feb. 27, 2007

(54) PROJECTION OPTICAL SYSTEM AND OPTICAL SYSTEM

(75) Inventor: Toshihiro Sunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/235,620

(22) Filed: Sep. 4, 2002

(65) Prior Publication Data

US 2003/0133082 A1 Jul. 17, 2003

(30) Foreign Application Priority Data

Sep. 4, 2001 (JP) .................... 2001-267925

(51) Int. Cl.
*G03B 21/14* (2006.01)
*H04N 5/74* (2006.01)
*G02B 26/08* (2006.01)

(52) U.S. Cl. .............. 353/70; 353/69; 348/756; 359/216; 359/217

(58) Field of Classification Search .............. 353/70, 353/69, 31; 348/156; 359/216, 217
See application file for complete search history.

(56) References Cited

U.S. PATENT DOCUMENTS

| | | | |
|---|---|---|---|
| 4,003,080 A | | 1/1977 | Maiman et al. ............... 358/63 |
| 4,861,983 A | * | 8/1989 | Sasada et al. ............... 359/212 |
| 4,930,849 A | | 6/1990 | Tanaka ............... 350/6.6 |
| 5,005,928 A | | 4/1991 | Suzuki et al. |
| 5,182,659 A | * | 1/1993 | Clay et al. ............... 359/17 |
| 5,614,961 A | * | 3/1997 | Gibeau et al. ............... 348/750 |
| 5,825,403 A | | 10/1998 | Iima et al. ............... 347/259 |
| 5,825,560 A | | 10/1998 | Ogura et al. ............... 359/822 |
| 5,847,887 A | | 12/1998 | Ogura et al. ............... 359/822 |
| 5,859,721 A | | 1/1999 | Oka |
| 5,920,361 A | * | 7/1999 | Gibeau et al. ............... 348/750 |

(Continued)

FOREIGN PATENT DOCUMENTS

| | | |
|---|---|---|
| EP | 0 633 491 A1 | 1/1995 |
| EP | 0 727 686 A2 | 8/1996 |
| EP | 1 211 541 A1 | 6/2002 |
| JP | 61-090122 | 5/1986 |
| JP | 64-059226 | 3/1989 |
| JP | 05-080418 | 4/1993 |
| JP | 05-100312 | 4/1993 |
| JP | 06-295159 | 10/1994 |
| JP | 08-292371 | 11/1996 |
| JP | 08-292372 | 11/1996 |
| JP | 09 005650 | 1/1997 |

(Continued)

OTHER PUBLICATIONS

Corrigan, Robert W. "Scanned Linear Architecture Improves Laser Projectors," *Laser Focus World*, p. 169–174, Jan. 1999. XP–009001759.
European Search Report, Nov. 29, 2002.

*Primary Examiner*—Christopher Mahoney
(74) *Attorney, Agent, or Firm*—Morgan & Finnegan, LLP

(57) ABSTRACT

A projection optical system includes an optical modulation unit which outputs modulated light for displaying an image, an optical scanning unit on which the modulated light output from the optical modulation unit is incident, the optical scanning unit scanning the light from the optical modulation unit to obtain a two-dimensional image, and a plurality of curved reflecting surfaces on which the light scanned by the optical scanning means is sequentially incident, the plurality of curved reflecting surfaces sequentially reflecting the light scanned by the optical scanning means and projecting the light on a projected surface, wherein when an optical path of a ray connecting a center of a pupil of the projection optical system and a center of a projected image is set as a reference axis, the reference axis is inclined with respect to a normal to the projected surface.

12 Claims, 16 Drawing Sheets

U.S. PATENT DOCUMENTS

| | | | |
|---|---|---|---|
| 5,973,858 A | 10/1999 | Sekita | 359/729 |
| 5,995,287 A | 11/1999 | Sekita | 359/599 |
| 5,999,311 A | 12/1999 | Nanba et al. | 359/365 |
| 6,021,004 A | 2/2000 | Sekita et al. | 359/676 |
| 6,097,550 A | 8/2000 | Kimura | 359/729 |
| 6,104,520 A | 8/2000 | Yamawaki | 359/205 |
| 6,124,986 A | 9/2000 | Sekita et al. | 359/691 |
| 6,154,259 A * | 11/2000 | Hargis et al. | 348/756 |
| 6,163,400 A | 12/2000 | Nanba | 359/365 |
| 6,166,866 A | 12/2000 | Kimura et al. | 359/729 |
| 6,181,470 B1 | 1/2001 | Sekita | 359/364 |
| 6,215,596 B1 | 4/2001 | Araki et al. | 359/631 |
| 6,268,963 B1 | 7/2001 | Akiyama | 359/631 |
| 6,270,224 B1 | 8/2001 | Sunaga et al. | 359/857 |
| 6,278,553 B1 | 8/2001 | Akiyama | 359/627 |
| 6,292,309 B1 | 9/2001 | Sekita et al. | 359/729 |
| 6,310,736 B1 | 10/2001 | Togino | 359/834 |
| 6,366,411 B1 | 4/2002 | Kimura et al. | 359/729 |
| 6,510,006 B1 | 1/2003 | Togino | 359/631 |
| 6,522,475 B2 | 2/2003 | Akiyama et al. | |
| 6,589,030 B2 | 7/2003 | Ozaki | 417/420 |
| 6,626,541 B2 * | 9/2003 | Sunaga | 353/69 |
| 2002/0008896 A1 | 1/2002 | Ishibe | 359/205 |
| 2002/0057421 A1 | 5/2002 | Kurematsu et al. | 353/74 |

FOREIGN PATENT DOCUMENTS

| | | |
|---|---|---|
| JP | 09-222561 | 8/1997 |
| JP | 9-243946 | 9/1997 |
| JP | 10-111458 | 4/1998 |
| JP | 11-064758 | 3/1999 |
| JP | 11-084291 | 3/1999 |
| JP | 11-337826 | 12/1999 |
| JP | 2000-89227 | 3/2000 |
| JP | 2000-089227 | 3/2000 |
| JP | 2000-171716 | 6/2000 |
| JP | 2000-171717 | 6/2000 |
| JP | 2001-180779 | 6/2000 |
| JP | 2001-194617 | 7/2001 |
| JP | 2001-215412 | 8/2001 |
| JP | 2001-215612 | 8/2001 |
| JP | 2001-221949 | 8/2001 |
| JP | 2001-222063 | 8/2001 |
| JP | 2001-242381 | 9/2001 |
| JP | 2003-29149 | 1/2003 |
| WO | 92/09913 | 6/1992 |

* cited by examiner

PROJECTION OPTICAL SYSTEM AND OPTICAL SYSTEM

BACKGROUND OF THE INVENTION

1. Field of the Invention

The present invention relates to a projection optical system for obliquely projecting a two-dimensional image formed by scanning light from a light source and an optical system suitable for oblique projection or oblique image pickup.

2. Description of the Related Art

As a projection optical system used for a forward projection type projector, a projection optical system capable of obliquely projecting an image on a screen to shorten the distance between the screen and an apparatus has been proposed.

FIG. 13 shows a projector disclosed in Japanese Patent Application Laid-Open No. 5-100312. Referring to FIG. 13, this projector includes an illumination light source L and a light valve LV using a reflection dot matrix liquid crystal device or the like. A projection optical system enlarges and projects an image formed on the light valve LV onto a screen S. In this projector, a wide-angle lens having a large field angle is used as a projection optical system, the light valve LV and screen S are so arranged to be shifted with respect to the optical axis of the projection optical system, and projection is performed by using an end portion of the field angle, thereby forming an oblique projection optical system.

FIG. 14 shows the projector disclosed in Japanese Patent Application Laid-Open No. 5-080418. Referring to FIG. 14, this projector includes an illumination light source L and a light valve LV using a transmission or reflection dot matrix liquid crystal device or the like. The first projection optical system forms an intermediate image of an image formed on the light valve LV. The second projection optical system enlarges and projects this intermediate image on a screen S. In this projector, the first and second projection optical systems are inclined with respect to the optical axis to perform oblique projection on the screen S.

In addition, International Publication No. WO97/01787 discloses a projection optical system constituted by a plurality of reflecting surfaces.

Japanese Patent Application Laid-Open No. 9-5650 discloses a design method for a decentered optical system and a method of calculating a paraxial quantity such as a focal length. In addition, Japanese Patent Application Laid-Open Nos. 8-292371, 8-292372, and 9-222561 disclose design methods for such optical systems. It has become clear from these design examples that an optical system whose aberration is sufficiently corrected can be formed by introducing the concept of a reference axis and forming a constituent surface using an asymmetrical spherical surface.

Such a decentered optical system is called an off-axial optical system. Considering a reference axis extending along a ray passing through an image center and pupil center, this optical system is defined as an optical system including a curved surface (off-axial curved surface) which is designed such that the normal to the constituent surface at the intersection between the surface and the reference axis does not exist on the reference axis. The reference axis has a bent shape.

In this off-axial optical system, the constituent surface becomes decentered, and no vignetting occurs on the reflecting surfaces, thus facilitating the construction of an optical system using reflecting surfaces. In addition, an intermediate image is formed in the optical system. This makes it possible to form a compact optical system with a large field angle.

Although this optical system is a front stop optical system, optical paths can be routed relatively freely. This makes it possible to form a compact optical system.

In addition, Japanese Patent Application Laid-Open No. 6-295159 discloses an apparatus which displays an image by two-dimensionally scanning a laser beam with a rotating polyhedral mirror. In this case, distortion can be corrected by setting the timing of intensity modulation of a laser beam to a proper value, i.e., electrical correction.

As disclosed in Japanese Patent Application Laid-Open No. 5-100312, in the projection optical system in which the light valve and screen are shifted from the optical axis, although the field angle to be used is θ2, a large lens system with a large field angle which covers a considerably large field angle (θ1) is required, as shown in FIG. 15.

When an optical axis A extends to the center of the screen S as shown in FIG. 16, an image is not formed on the screen S in a general lens system but is formed on a plane S' perpendicular to the optical axis. In this case, the image undergoes trapezoidal distortion. As a result, the image falls out of focus on the screen S in the vertical direction.

In order to correct the inclination of this image plane, the difference between an optical path L1 of a ray passing through an upper portion of the screen S and an optical path L2 of a ray passing through a lower portion of the screen S must be canceled out. In correcting this different, if correction can be made near the imaging plane, since the difference between the optical paths L1 and L2 is reduced, the correction amount can be reduced. If, however, correction is made on an optical pane on the screen side where the image is enlarged, the difference between the optical paths L1 and L2 directly affects the correction.

In the optical system disclosed in Japanese Patent Application Laid-Open No. 5-80418, since the lens system is simply tilted, it is difficult to incline an image plane sufficiently. In addition, if the tilt amount of the lens system is excessively large, it is difficult to ensure high optical performance.

In the optical system disclosed in International Publication No. WO97/01787, one reflecting surface increases in size, resulting in difficulty in manufacturing the optical system with high precision.

As disclosed in Japanese Patent Application Laid-Open No. 6-295159, in the method of displaying an image by scanning a point light source or one-dimensional image display element with a rotating polyhedral mirror or galvano mirror, distortion may not satisfactorily be corrected by electrical correction alone. In this case, optical correction is required.

SUMMARY OF THE INVENTION

The present invention has been made in consideration of the above situation, and has as its object to provide an oblique projection or incidence type optical system which attains a reduction in size and has little distortion.

In order to achieve the above object, a projection optical system according to an embodiment of the present invention includes an optical modulation unit which outputs modulated light for displaying an image, an optical scanning unit which scans the light from the optical modulation unit to obtain a two-dimensional image, and a plurality of curved reflecting surfaces by which the light scanned by the optical scanning unit is reflected to be projected on a projected surface. A reference axis connecting the center of the pupil of the projection optical system and the center of the projected image is inclined with respect to the normal to the projected surface.

Another embodiment of the present invention is an optical system which makes two planes at different distances have an optically conjugate relationship by using a curved reflecting surface. The light reflected by the curved reflecting surface of this optical system is scanned on an image area, which extends in a predetermined direction, in a direction perpendicular to the predetermined direction to become a two-dimensional image. The optical system is made to have an f·tanθ characteristic in the predetermined direction as a whole, and have an f–θ lens characteristic or arc sine lens characteristic in a direction perpendicular to the predetermined direction.

DETAILED DESCRIPTION OF THE PREFERRED EMBODIMENTS

Figure 19:
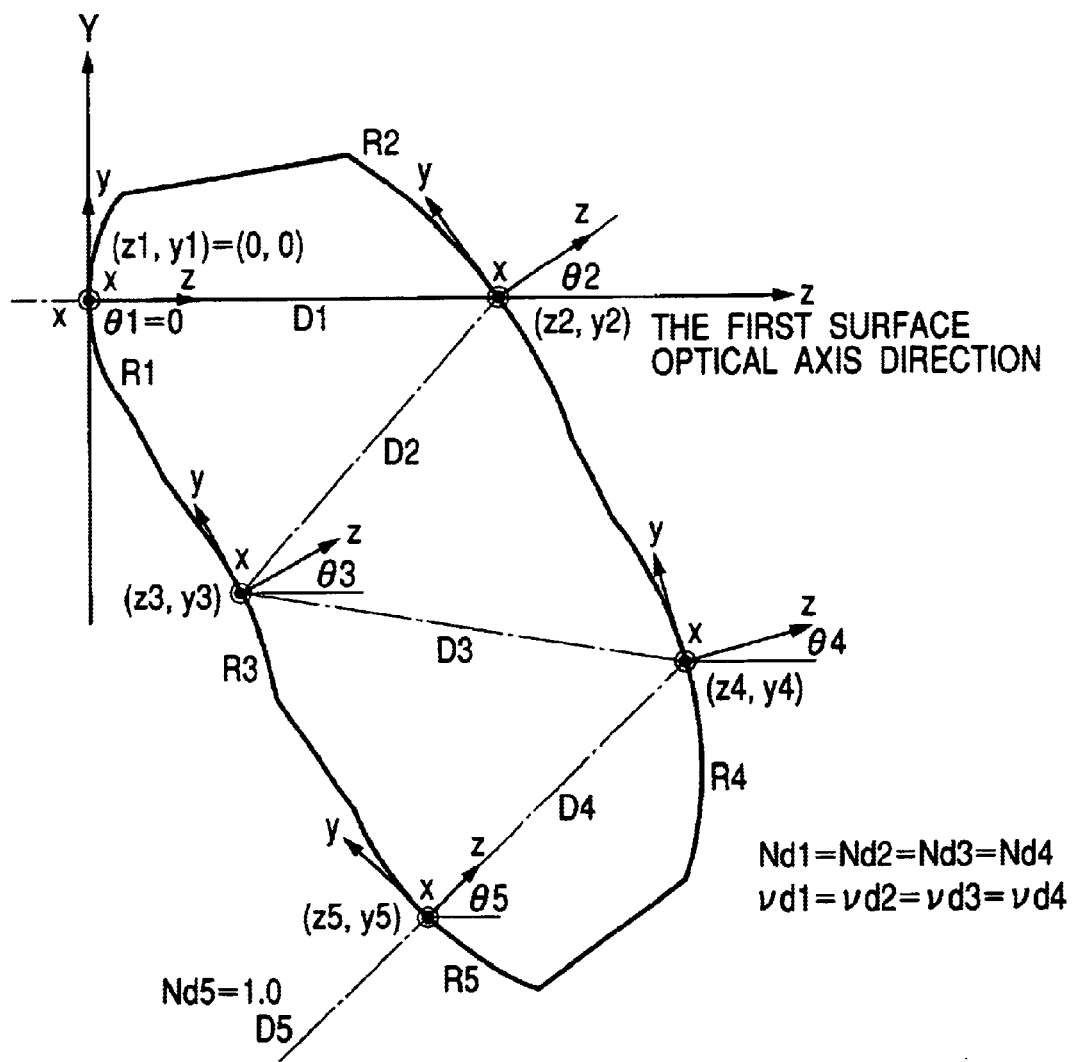
FIG. 19 is a view for explaining coordinate systems for a projection optical system according to each embodiment of the present invention.

Prior to a description of the embodiments of the present invention, the manner in which the constituent elements of each embodiment are expressed and items common to all the embodiments will be described below. FIG. 19 is a view for explaining a coordinate system for defining the constituent data of an optical system according to each embodiment.

Referring to FIG. 19, a first surface R1 is a refracting surface, a second surface R2 is a reflecting surface tilted with respect to the first surface R1, third and fourth surfaces R3 and R4 are reflecting surfaces shifted and tilted with respect to the preceding surfaces, and a fifth surface R5 is a refracting surface shifted and tilted with respect to the fourth surface R4.

The first to fifth surfaces R1 to R5 are formed on one optical element made of a medium such as glass or plastic material. Referring to FIG. 19, this optical element is a first optical element B1.

Referring to FIG. 19, the medium between an object surface (not shown) and the first surface R1 is air, the medium between the first surface R1 and the fifth surface R5 is a common medium, and the medium between the fifth surface R5 and a sixth surface R6 (not shown) is air.

The optical system of this embodiment is an off-axial optical system, and hence the respective surfaces constituting the optical system have no common optical axis. In this embodiment, therefore, an absolute coordinate system having the center of the first surface as the origin is set.

The path of a ray (reference axis ray) passing through the center of the first surface which is the origin and the center of the final imaging plane is defined as a reference axis and indicated by the chain line in FIG. 19. The reference axis in this embodiment has a direction (orientation). This direction coincides with the direction in which a reference axis ray propagates at the time of imaging.

In this embodiment, a reference axis as a reference for an optical axis is set in the above manner. As a reference axis for an optical system, however, an optimal axis may be determined from the viewpoint of optical design, adjustment of aberration, or the manner in which the respective surface shapes constituting the optical system are expressed. In general, the path of a ray passing through the center of an image plane or object plane and the center of a stop, incident pupil, exit pupil, or the first surface of the optical system or the center of the final surface is set as a reference axis serving as a reference for the optical system.

In this embodiment, the path of a ray (reference axis ray) that is refracted and reflected by the respective refracting and reflecting surfaces in the process of propagating from the center of the pupil of a projection optical system to the center of the final imaging plane (projected image) through the center of the first surface is set as a reference axis. The order of the respective surfaces is set to the order in which a reference optical ray is refracted and reflected.

A reference optical ray therefore reaches the final image plane while changing its direction in accordance with the laws of refraction and reflection in the set order of the respective surfaces.

Basically, all the tilt surfaces constituting the optical system of this embodiment are tilted within the same plane.

The respective axes of the absolute coordinate system are therefore defined as follows:

Z-axis: a straight line passing through the origin and the center of the object surface, assuming that the direction from the object surface to the first surface R1 is the positive direction;

Y-axis: a straight line passing through the origin and forming an angle of 90° counterclockwise with respect to the Z-axis within the tilt plane (the drawing surface of FIG. 19); and X-axis: a straight line that passes through the origin and is perpendicular to the Z- and Y-axes (a straight line perpendicular to the drawing surface of FIG. 19).

The surface shape of the ith surface of the optical system can be recognized more easily by expressing the surface shape on a local coordinate system having an intersection of a reference axis and the ith surface as the origin than by expressing the surface shape on an absolute coordinate system. For this reason, the surface shape of the ith surface is expressed on the local coordinate system.

In addition, the tilt angle of the ith surface in the Y-Z plane is expressed by an angle θi (unit: degree) with a counterclockwise direction with respect to the Z-axis in the absolute coordinate system being defined as a positive direction. In this embodiment, the origins of the local coordinate systems for the respective surfaces exist in the Y-Z plane in FIG. 19. There is no surface decentering within the X-Z and X-Y planes.

The y- and z-axes of the local coordinate system (x, y, z) of the ith surface are inclined at the angle θi within the Y-Z plane with respect to the absolute coordinate system (X, Y, Z), and are specifically defined as follows:

z-axis: a straight line passing through the origin of the local coordinate system and forming the angle θi counterclockwise within the Y-Z plane in the Z direction of the absolute coordinate system;

y-axis: a straight line passing through the origin of the local coordinate system and forming an angle of 90° counterclockwise within the Y-Z plane in the z direction; and x-axis: a straight line which passes through the origin of the local coordinate system and is perpendicular to the Y-Z plane.

Let Di be a scalar amount representing the distance between the ith surface and the origin of a local coordinate system for the (i+1)th surface, and Ndi and νdi be the refractive index and Abbe number of the medium between the ith surface and the (i+1)th surface, respectively.

In this case, the shape of a spherical surface is expressed by $$z = \frac{(x^2 + y^2)/Ri}{1 + \{1 - (x^2 + y^2)/Ri^2\}^{1/2}}$$

The optical system of this embodiment has at least one rotational asymmetrical aspherical surface. The shape of this surface is expressed by $$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6$$

Since the above curved surface expression includes only even-numbered order terms with respect to x, the curved surface defined by the above curved surface expression has a plane-symmetrical shape with only the y-z plane being a symmetrical surface. If the following condition is satisfied, the curved surface has a shape symmetrical with respect to the x-z plane:

$$C03 = C21 = t = 0$$

In addition, if the following condition is satisfied, the curved surface has a rotational symmetrical shape. If the following condition is not satisfied, the curved surface has a rotational asymmetrical shape:

$$C02 = C20 \quad C04 = C40 = C22/2 \quad C06 = C60 = C24/3 = C42/3$$

(First Embodiment)

Figure 1:
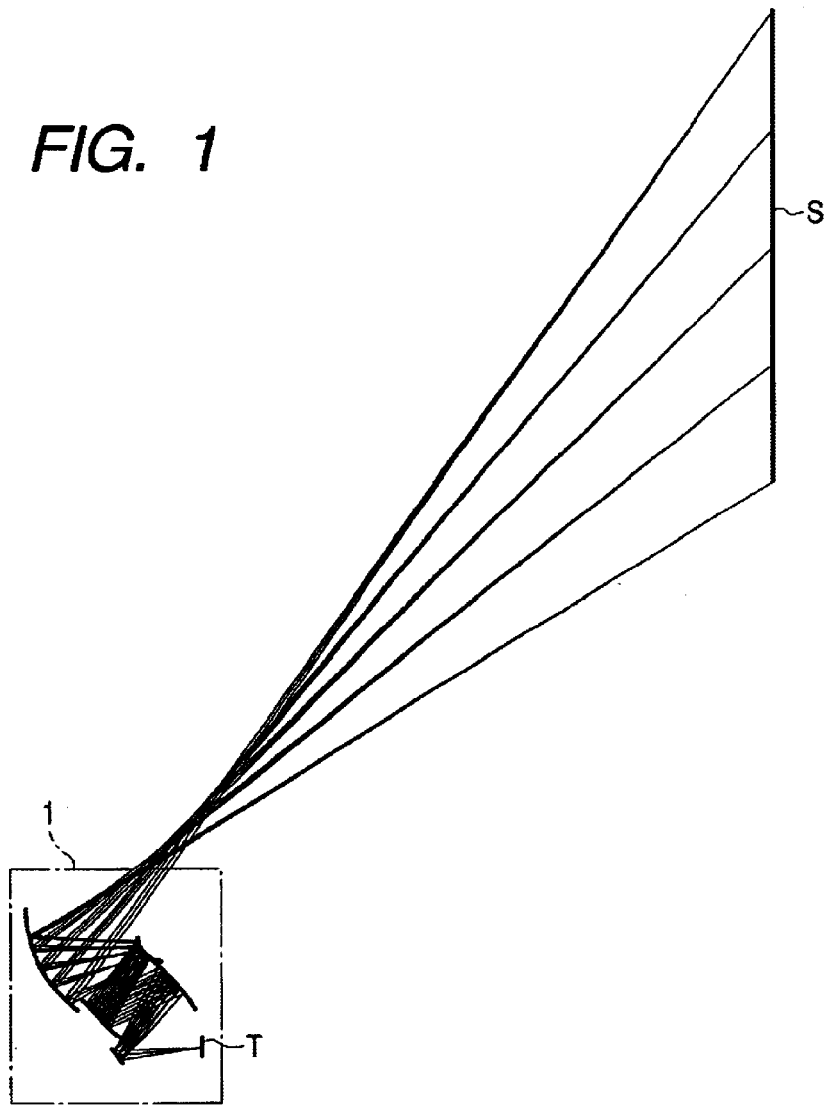
FIG. 1 is a view showing the arrangement of an image projection apparatus according to the first embodiment of the present invention.

FIG. 1 shows an image projection apparatus according to the first embodiment of the present invention. Referring to FIG. 1, as a one-dimensional optical modulation unit T, a self-emission device which can modulate an emission intensity of a light-emission diode, semiconductor laser, or the like can be used. Instead of such a self-emission device, a unit including a light valve using a dot matrix liquid crystal panel or mirror device and a lighting system for causing illumination light strike the light valve may be used.

Figure 2:
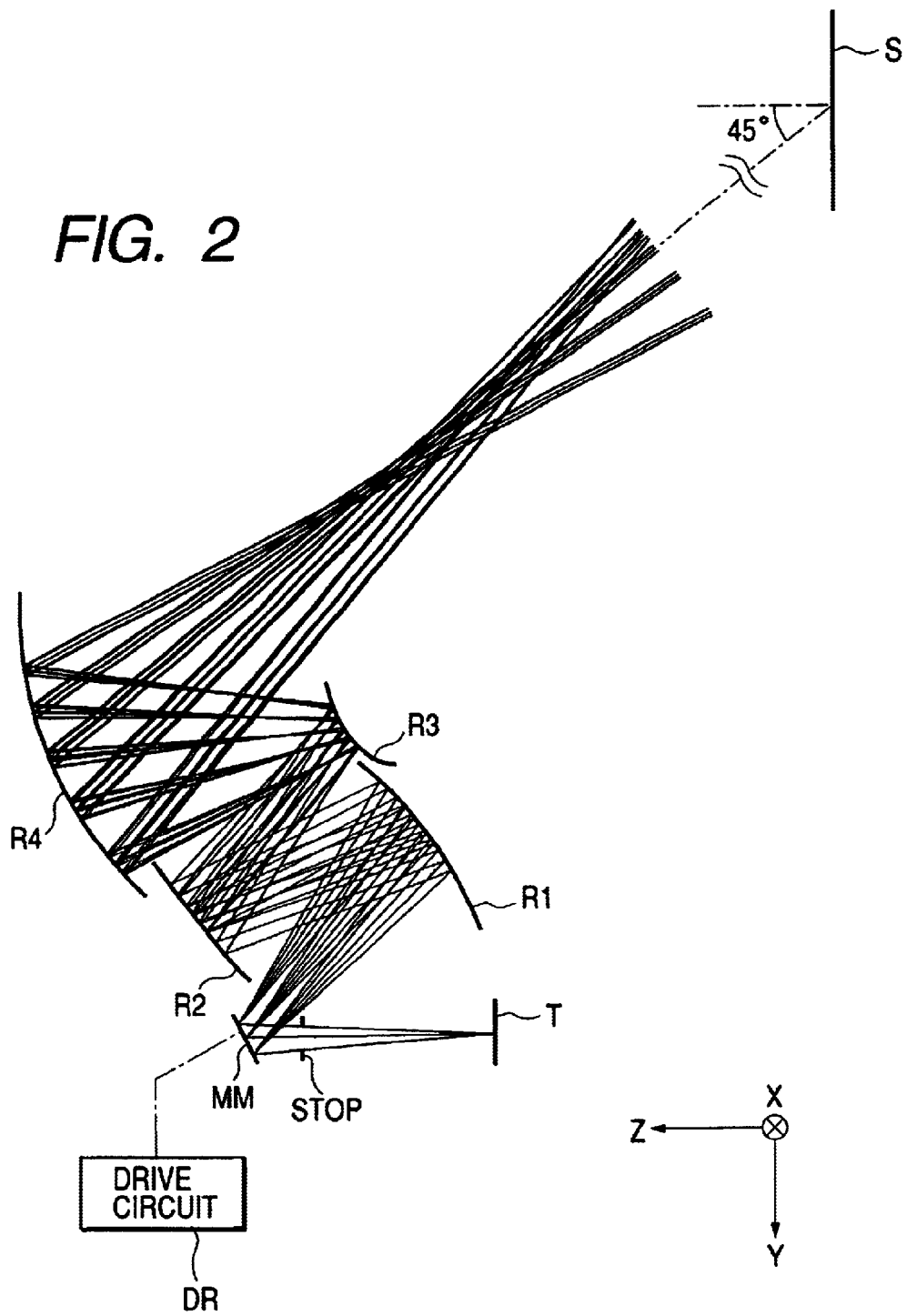
FIG. 2 is an enlarged view of a projection optical system used in the image projection apparatus according to the first embodiment.

A projection optical system 1 is used to enlarge/project an image formed by the optical modulation unit T onto a screen (projected surface) S. FIG. 2 shows the arrangement of this system in more detail.

The projection optical system 1 includes a stop STOP and an optical scanning unit MM such as a galvano mirror or rotating polyhedral mirror.

The length of the optical modulation unit T in the Y-axis direction is 8 mm. The screen S has an aspect ratio of 3:4 and a diagonal of 300 mm.

The reference axis of the projection optical system 1 is inclined at 45° with respect to the normal to the screen S. The following are the constituent data of the projection optical system 1 used in this embodiment.

| | Stop Diameter: 3.00 | | | | |
|---|---|---|---|---|---|
| i | Yi | Zi | θ | Di | |
| 0 | 0.00 | 0.00 | 0.00 | 24.00 | Optical modulation unit |
| 1 | 0.00 | 0.00 | 0.00 | 7.00 | Stop |
| 2 | 0.00 | 7.00 | 25.00 | 33.00 | Optical modulation unit |
| 3 | −25.28 | −14.21 | 35.00 | 30.07 | Reflecting surface |
| 4 | −15.00 | 14.04 | 37.00 | 30.00 | Reflecting surface |
| 5 | −39.27 | −3.59 | 29.00 | 36.66 | Reflecting surface |
| 6 | −36.71 | 32.97 | 21.81 | 380.00 | Reflecting surface |
| 7 | −278.99 | −259.77 | −5.39 | | Image plane |

| Aspherical Surface Shape | | | |
|---|---|---|---|
| Surface R3 | C02 = 6.89532e-003 | C20 = 7.01247e-003 | C40 = 5.43875e-007 |
| | C03 = -5.62480e-005 | C21 = -5.55500e-005 | C41 = -3.75781e-009 |
| | C04 = -7.69711e-007 | C22 = -1.25238e-007 | C42 = -8.49058e-010 |
| | C05 = -5.81133e-008 | C23 = -4.47631e-008 | |
| | C06 = -9.18693e-010 | C24 = 2.47227e-010 | |
| | C60 = 1.61412e-010 | | |
| Surface R4 | C02 = -1.97978e-003 | C20 = -2.18197e-003 | C40 = 2.81918e-006 |
| | C03 = -2.38121e-004 | C21 = -2.16780e-004 | C41 = -2.94833e-008 |
| | C04 = 5.16127e-006 | C22 = 7.94060e-006 | C42 = -7.26821e-009 |
| | C05 = -1.87169e-007 | C23 = -1.50961e-007 | |
| | C06 = 6.48244e-009 | C24 = 4.97120e-009 | |
| | C60 = 6.40456e-010 | | |
| Surface R5 | C02 = -2.73356e-002 | C20 = -1.41520e-002 | C40 = 1.82935e-005 |
| | C03 = -1.82568e-003 | C21 = -5.75023e-004 | C41 = 3.80418e-006 |
| | C04 = -2.53442e-004 | C22 = -5.04656e-006 | C42 = 3.80481e-007 |
| | C05 = -5.46379e-005 | C23 = 1.50746e-006 | |
| | C06 = -5.90261e-006 | C24 = 2.53956e-008 | |
| | C60 = 4.13581e-008 | | |
| Surface R6 | C02 = -8.86201e-003 | C20 = -1.31404e-002 | C40 = -1.70195e-006 |
| | C03 = 2.11881e-005 | C21 = 7.70568e-005 | C41 = 3.41951e-009 |
| | C04 = -1.43952e-006 | C22 = -3.53294e-006 | C42 = -2.10540e-010 |
| | C05 = 3.50386e-008 | C23 = 4.72628e-008 | |
| | C06 = -8.75791e-010 | C24 = -1.91391e-009 | |
| | C60 = -1.78168e-010 | | |

Assume that the center of the screen S is the origin, and a ray is formed into an image on the center of screen at an angle of 0°. In this case, when the image height on the screen S in the y direction is -100%, -50%, 0%, 50%, and 100%, the deflection angle of an optical scanning unit becomes 2.437, 1.286, 0, -1.35, and -2.753, respectively. The positive and negative signs of angles conform to the tilt angles of the reflecting surfaces.

In this case, the positive and negative deflection angles of the optical scanning unit are asymmetrical. In this embodiment, since the reference axis of the optical system is inclined with respect to the screen S, the optical system inevitably exhibits asymmetrical characteristic in the vertical direction of the screen S. This asymmetrical optical characteristic is corrected by setting asymmetrical deflection angles on the positive and negative sides.

Referring to FIGS. 1 and 2, the projection optical system 1 is comprised of the stop STOP, the optical scanning unit MM, and four reflecting surfaces, namely a concave mirror R1, concave mirror R2, convex reflecting surface R3, and concave mirror R4, which are arranged in the order in which a ray from the optical modulation unit T passes therethrough. All the reflecting surfaces are symmetrical only with respect to the Y-Z plane. That is, each reflecting surface is a rotational asymmetrical surface having one symmetrical surface.

A light beam is formed into an intermediate image between the convex mirror R3 and the concave mirror R4, and a pupil image is formed near the concave mirror R4. Since a stop image is formed into a real image by the optical system located closer to the screen than the stop, the effective ray diameter on each surface is suppressed small to achieve miniaturization of the respective optical elements and overall photographing optical system.

The optical effects of this embodiment will be described next. Three color light beams, i.e., red, green, and blue light beams, modulated by the optical modulation unit T are combined on a single optical axis by a color combining optical system (not shown). The amount of combined light is then limited by the stop STOP.

In this case, as the color combining optical system, a dichroic prism, optical wedge, or the like can be used.

The light beam reflected by the optical scanning unit MM is enlarged while sequentially being reflected by the four reflecting surfaces R1 to R4, and a one-dimensional image is displayed on the screen S. The optical scanning unit MM is swung/driven by a drive circuit DR to scan the reflected light, thereby displaying a two-dimensional image on the screen S.

Figure 3:
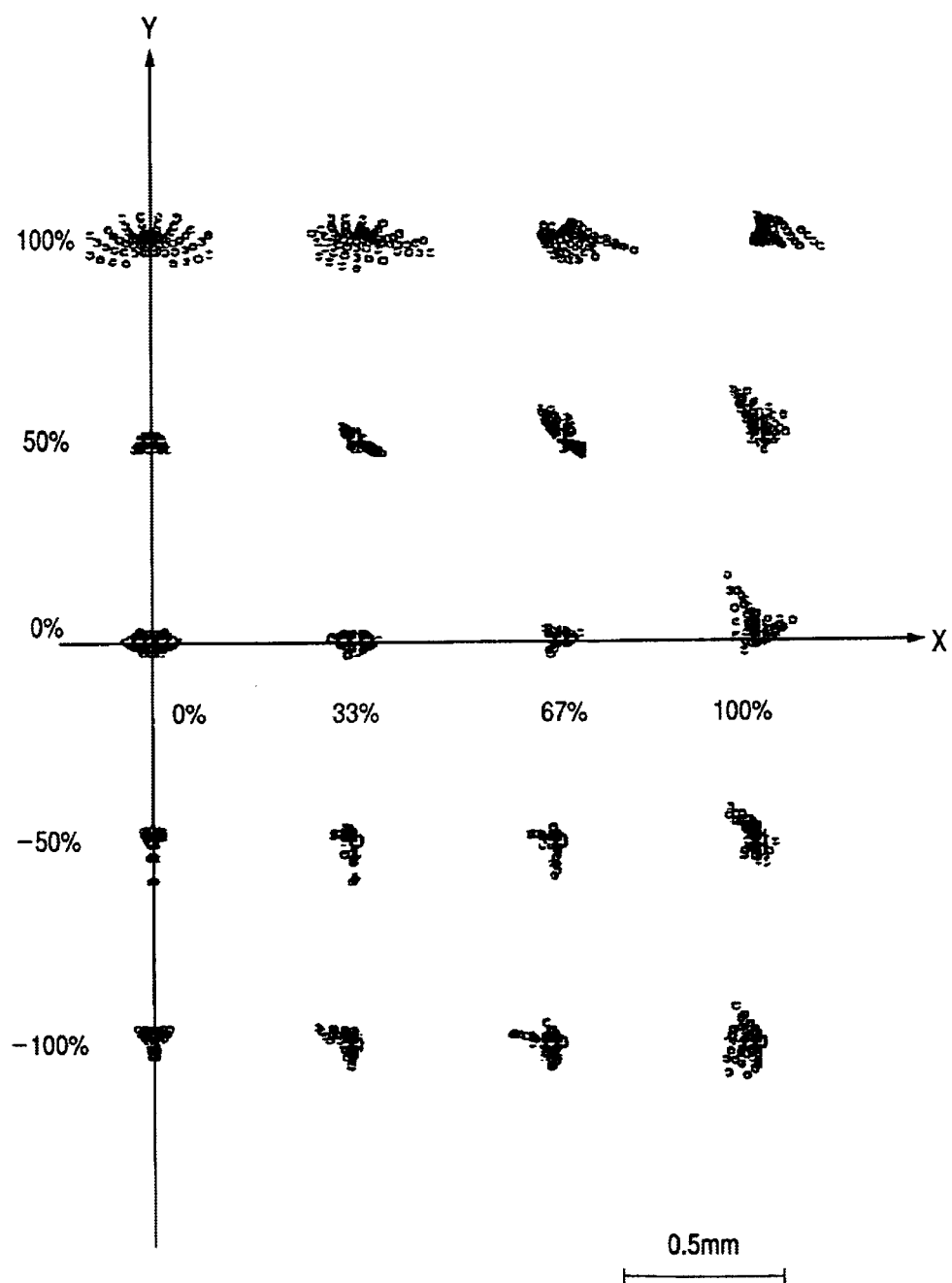
FIG. 3 is a view showing the sizes of spots on a screen which are projected by the image projection apparatus according to the first embodiment.

FIG. 3 shows the sizes of spots on the screen S. More specifically, FIG. 3 shows the spots at the positions obtained by dividing the image height in the positive x direction by four into 0%, 33%, 67%, and 100% and also dividing the image height in the y direction by five into -100%, -50%, 0%, 50%, and 100%, i.e., 20 positions on the screen S, with the center of the screen S being the origin. Note that an illustration of spots in the negative x direction is omitted from FIG. 3 because this arrangement is symmetrical with respect to the Y-Z plane of the screen.

Figure 4:
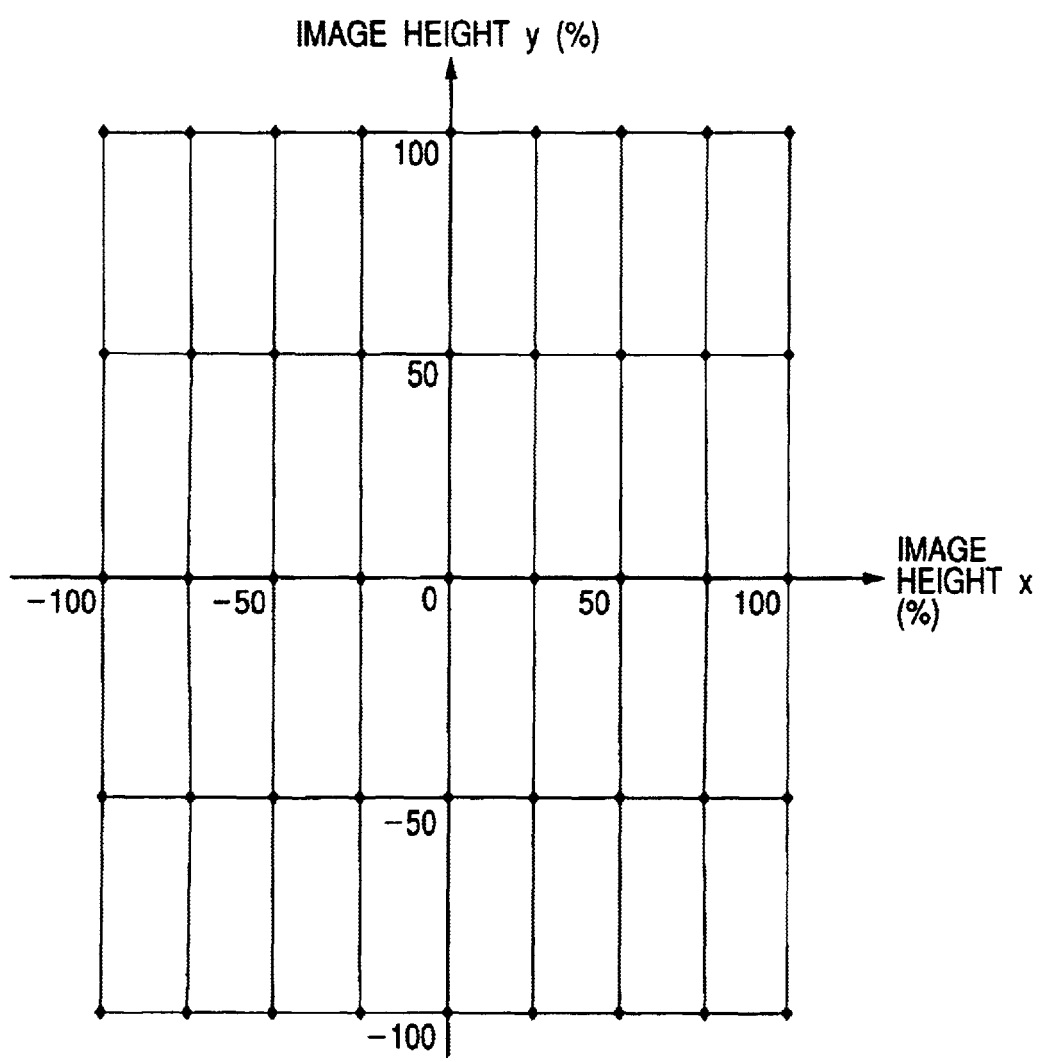
FIG. 4 is a view showing distortion in the projection optical system according to the first embodiment.

FIG. 4 shows the state of distortion in the projection optical system 1 according to this embodiment. As is obvious from FIG. 4, slight distortion is seen near an image height of ±67%, but there is no large distortion as a whole, and only little asymmetrical distortion is seen.

In this embodiment and each embodiment to be described later, letting θ be the tilt angle of the reference axis with respect to the normal to the projected surface, α be the azimuth representing a plane including the reference axis and the normal to the projected surface, and β(ξ) be the magnification at an azimuth ξ° around the reference axis of this projection optical system, the following condition is preferably satisfied:

$$|1-\beta(\alpha)/(\beta(\alpha+90°)\cos\theta)|<0.3 \quad \ldots (1)$$

In the projection optical system 1 used in this embodiment, when a light beam from the center of the optical modulation unit T is formed into an image on the center of the screen S, focal lengths f1(0) and f1(90) at azimuths of 0° and 90°, front-side principal points H1(0) and H1(90) with respect to the stop plane, and magnifications β1(0) and β1(90) at azimuths of 0° (scanning direction) and 90° (non-scanning direction) around the reference axis respectively become:

f1(0)=−13.9276, f1(90)=−11.5646

H1(0)=−37.2581, H1(90)=−35.2098

β1(0)=f1(0)/(f1(0)−24−H1(0))=20.8

β1(90)=f1(90)/(f1(90)−24−H1(90))=32.6

Therefore, $$|1-\beta 1(0)/(\beta 1(90)\times \cos(45°))|=0.098<0.3 \quad (1)$$

(where 45° is the angle defined by the normal to the screen S and the reference axis.)

Figure 16:
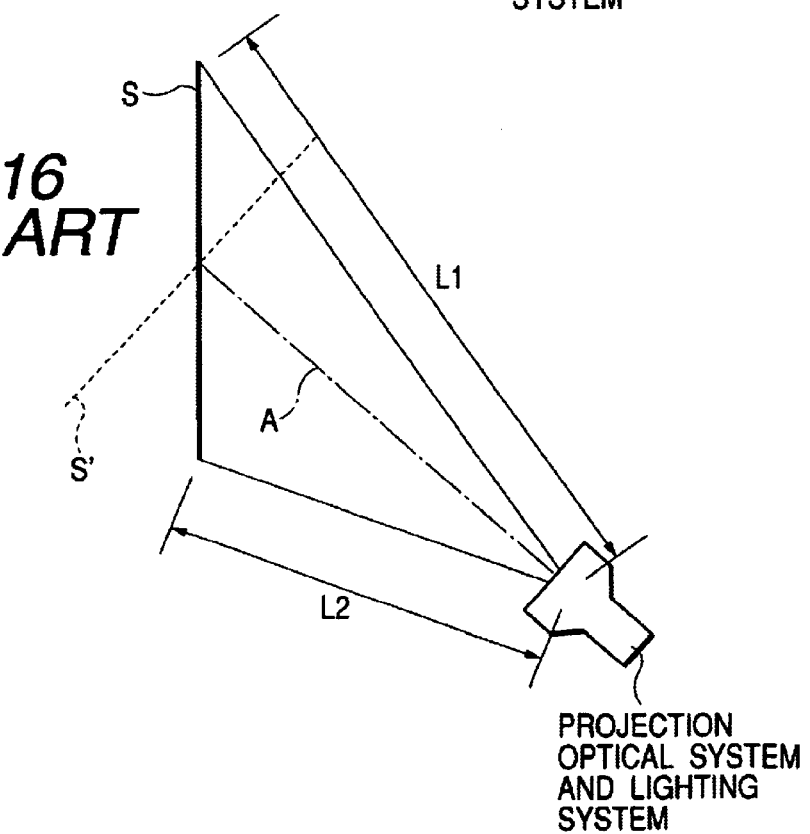
FIG. 16 is a view showing a conventional oblique projection optical system.
Figure 17:
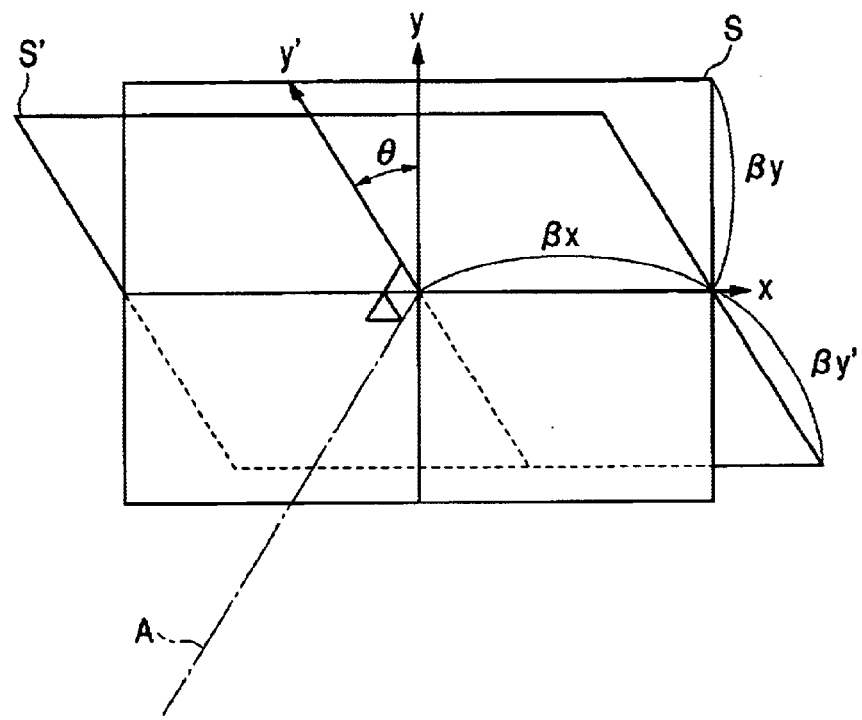
FIG. 17 is a conceptual view of an image projected by the projection optical system in FIG. 16 and a screen.

FIG. 17 shows a portion corresponding to the screen S in FIG. 16. FIG. 17 shows a reference axis A, the inclined screen S, and a plane S' perpendicular to the reference axis A. The screen S and plane S' are inclined at the angle θ. Basically, the image enlarged/projected by the projection optical system is formed on the plane S'.

As disclosed in Japanese Patent Application Laid-Open No. 9-5650, when an evaluation plane around the reference axis A is evaluated as the plane S' perpendicular to the reference axis, the paraxial quantities at the azimuth ξ and azimuth ξ+180° exhibit the same value. Therefore, the paraxial quantities indicated by Japanese Patent Application Laid-Open No. 9-5650 do not cause inclination of an image plane. That is, it can be interpreted that an image plane inclines because of aberration of the same kind as curvature of field, i.e., aberration that causes a shift of a focal position with an increase in distance from the line of intersection of the screen S and the plane S'.

Figure 18:
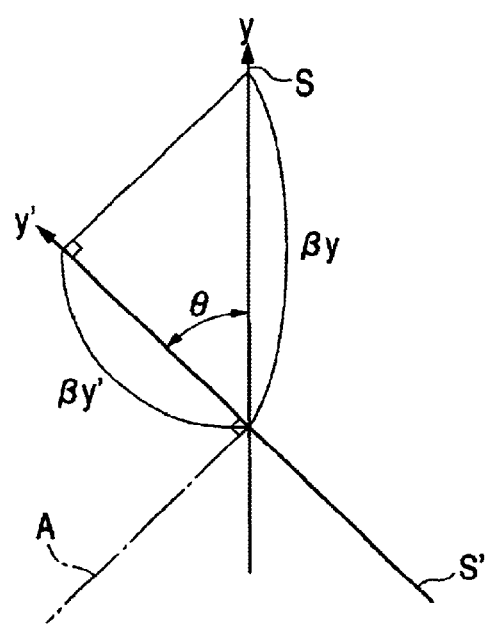
FIG. 18 is a view showing the relationship between oblique projection and magnification.

When such an interpretation is made, since it can be thought that a magnification βy' on the plane S' as the evaluation plane in the y direction is a projection of a magnification βy on the screen S, the following relation must be satisfied to keep the aspect ratio on the screen S:

$$\beta y = \beta y'/\cos\theta = \beta x \quad \text{(see FIG. 18)}$$

$$\beta y'/\beta x = \cos\theta = \frac{(f(0)-ss'(0))/f(0)}{(f(90)-ss'(90))/f(90)} \quad (2)$$

where ss'(0) and ss' (90) are the distances from the principal position on the screen side of the projection optical system to the screen at azimuths of 0° and 90°, respectively. That is, satisfying expression (1) is the condition that keeps the aspect ratio of a two-dimensional projected image on the screen S. If the value in expression (1) exceeds 0.3, the distortion increases, resulting in difficulty in correcting the aberration.

In this embodiment, the rotational asymmetrical reflecting surface is used as an upper reflecting surface. As disclosed in Japanese Patent Application Laid-Open Nos. 8-292372, 9-222561, and 9-258105, however, an optical block having a rotational asymmetrical reflecting surface formed on the surface of a transparent member may be used. Alternatively, a plurality of rotational asymmetrical upper reflecting surfaces may be integrally molded.

In this embodiment, the four rotational asymmetrical reflecting surfaces are used. However, the number of reflecting surfaces is not limited to four. In consideration of aberration correction, however, at least three reflecting surfaces are preferably used. In addition, each rotational asymmetrical reflecting surface is symmetrical with respect to a given plane. However, the present invention is not limited to this.

(Second Embodiment)

Figure 5:
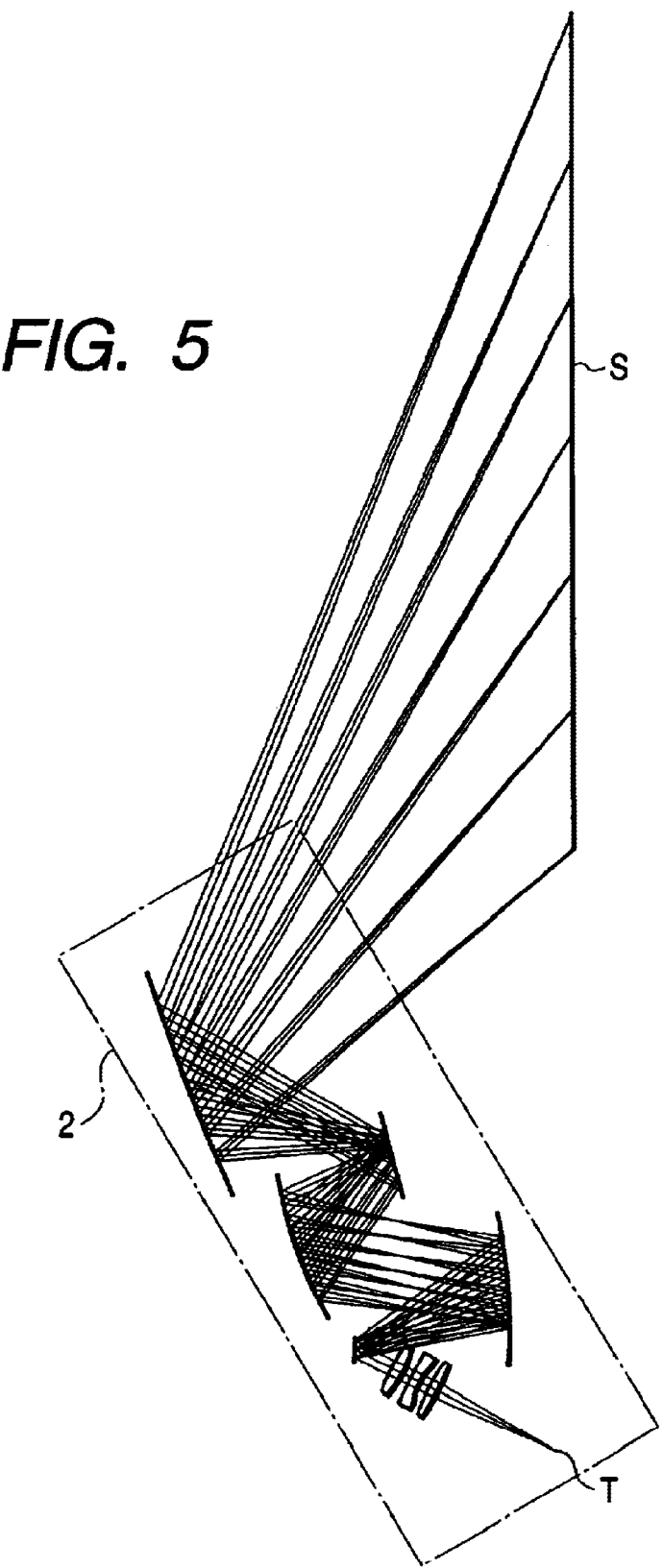
FIG. 5 is a view showing the arrangement of an image projection apparatus according to the second embodiment of the present invention.

FIG. 5 shows the arrangement of an image projection apparatus according to the second embodiment of the present invention. Referring to FIG. 5, as a one-dimensional optical modulation unit T, a self-emission device which can modulate an emission intensity of a light-emission diode, semiconductor laser, or the like can be used. Instead of such a self-emission device, a unit including a light valve using a dot matrix liquid crystal panel or mirror device and a lighting system for causing illumination light strike the light valve may be used.

Figure 6:
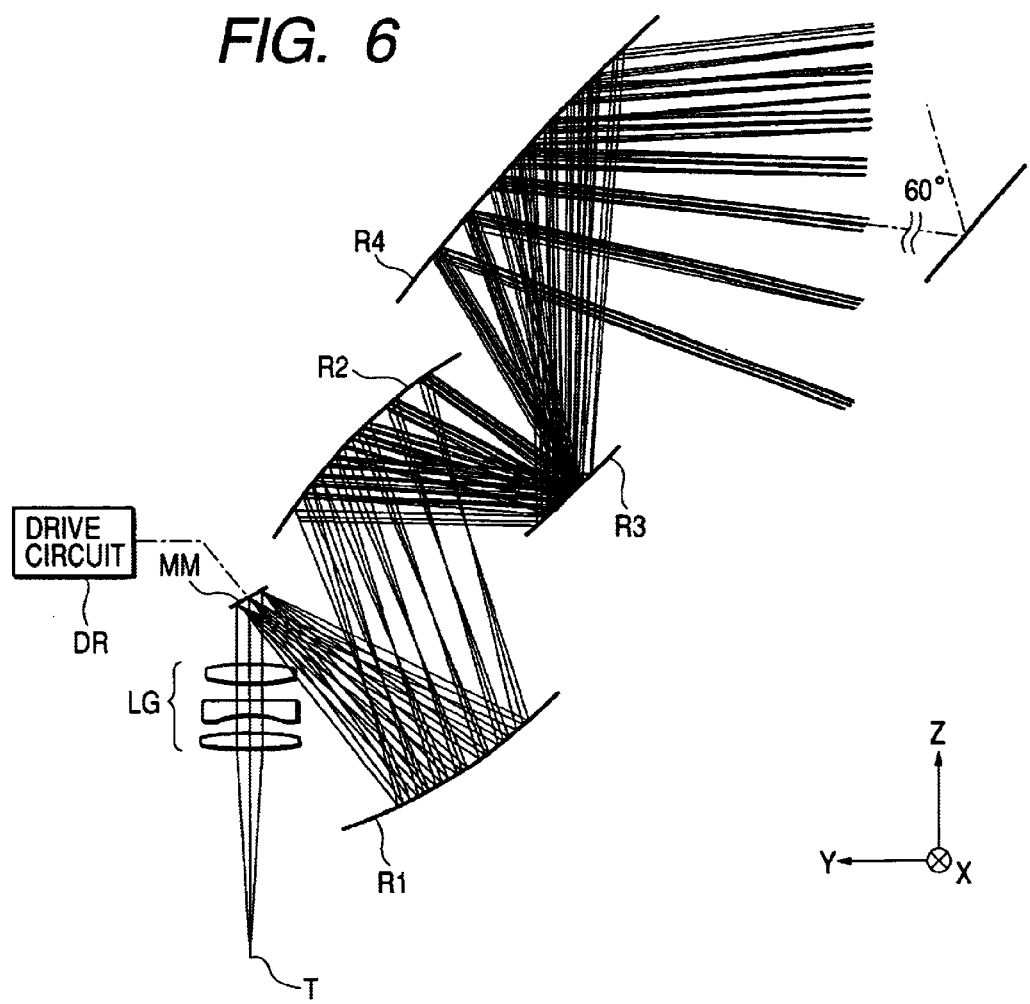
FIG. 6 is an enlarged view of a projection optical system used in the image projection apparatus according to the second embodiment.

A projection optical system 2 is used to enlarge/project an image formed by the optical modulation unit T onto a screen (projected surface) S. FIG. 6 shows the arrangement of this system in more detail.

The projection optical system 2 includes a refractive lens group LG and an optical scanning unit MM such as a galvano mirror or rotating polyhedral mirror, which also serves as a stop.

The length of the optical modulation unit T in the Y-axis direction is 2.7 mm. The screen S has an aspect ratio of 4:3 and a diagonal of 50 mm.

The reference axis of the projection optical system 2 is inclined at 60° with respect to the normal to the screen S. The following are the constituent data of the projection optical system 2 used in this embodiment.

| | | | Fno 8 | | | |
|---|---|---|---|---|---|---|
| i | Yi | Zi | θ | Di | Ni | vi |
| 0 | 0.00 | 0.00 | 0.00 | 5.985 | 1 | Optical modulation unit |
| 1 | 0.00 | 0.00 | 0.00 | 0.50 | 1.60524 | 60.64 Refracting surface |
| 2 | 0.00 | 0.50 | 0.00 | 0.50 | 1 | Refracting surface |
| 3 | 0.00 | 1.00 | 0.00 | 0.50 | 1.85415 | 23.78 Refracting surface |
| 4 | 0.00 | 1.50 | 0.00 | 0.50 | 1 | Refracting surface |
| 5 | 0.00 | 2.00 | 0.00 | 0.50 | 1.49353 | 57.40 Refracting surface |
| 6 | 0.00 | 2.50 | 0.00 | 2.00 | 1 | Refracting surface |
| 7 | 0.00 | 4.50 | 25.00 | 7.91 | 1 | Optical scanning unit |
| 8 | −6.06 | −0.59 | 35.00 | 10.00 | | Reflecting surface |
| 9 | −2.64 | 8.81 | 48.94 | 6.61 | | Reflecting surface |
| 10 | −9.11 | 7.42 | 42.88 | 10.00 | | Reflecting surface |
| 11 | −7.74 | 17.33 | 47.77 | 35.96 | | Reflecting surface |
| 12 | −43.66 | 15.86 | 27.66 | | | Image plane |

Spherical Surface Shape

Surface R1 r1=5.034

Surface R2 r2=−7.162

Surface R3 r3=−5.000

Surface R4 r4=−22.488

Surface R5 r5=5.000

Surface R6 r6=−12.306

| Aspherical Surface Shape | | | |
|---|---|---|---|
| Surface R8 | C02 = 2.80457e−002 | C20 = 4.75069e−003 | C40 = 8.54417e−005 |
| | C03 = 2.97165e−003 | C21 = 2.08057e−003 | C41 = −1.33892e−018 |
| | C04 = 8.81644e−005 | C22 = −2.99262e−004 | C42 = −5.66908e−031 |
| | C05 = −3.77030e−018 | C23 = −2.11395e−017 | |
| | C06 = −7.28888e−032 | C24 = −5.66908e−031 | |
| | C60 = −5.31508e−032 | | |
| Surface R9 | C02 = −2.99863e−002 | C20 = −3.76538e−002 | C40 = 1.51011e−005 |
| | C03 = 2.14322e−003 | C21 = 6.48291e−004 | C41 = −1.70163e−017 |
| | C04 = −9.79316e−006 | C22 = 2.03030e−005 | C42 = −4.66720e−032 |
| | C05 = −5.36429e−020 | C23 = −2.68262e−019 | |
| | C06 = −4.16792e−033 | C24 = −4.66720e−032 | |
| | C60 = −7.44043e−033 | | |
| Surface R10 | C02 = 6.13921e−003 | C20 = 2.42964e−002 | C40 = 2.21569e−006 |
| | C03 = 1.09084e−003 | C21 = −4.27999e−003 | C41 = −2.81146e−017 |
| | C04 = −2.68164e−004 | C22 = 3.86440e−004 | C42 = −4.12698e−029 |
| | C05 = −3.88515e−018 | C23 = −5.40392e−017 | |
| | C06 = −4.32224e−030 | C24 = −4.12698e−029 | |
| | C60 = −4.12899e−030 | | |
| Surface R11 | C02 = −5.65076e−003 | C20 = −1.27578e−002 | C40 = −5.31550e−017 |
| | C03 = −1.48251e−004 | C21 = 6.91268e−004 | C41 = −1.61050e−005 |
| | C04 = −2.01954e−016 | C22 = −1.65971e−016 | C42 = −1.28171e−006 |
| | C05 = 1.24840e−006 | C23 = −9.49219e−006 | |
| | C06 = −1.42993e−008 | C24 = 1.44926e−016 | |
| | C60 = −6.52299e−016 | | |

Assume that the center of the screen S is the origin and a ray is formed into an image on the center of screen at an angle of 0°. In this case, when the image height on the screen S in the y direction is −100%, −67%, −33%, 0%, 33%, 67%, and 100%, the deflection angle of the optical scanning unit MM becomes 7, 4.67, 2.33, 0, −2.33, −4.67, and −7, respectively. The positive and negative signs of angles conform to the tilt angles of the reflecting surfaces.

In this case, the deflection angle of the optical scanning unit MM exhibits proportionality on the screen S in the y direction. That is, this unit has an f-θ lens characteristic in the y direction.

In the x direction, this unit forms a one-dimensional image, and hence has an f·tanθ characteristic which is a general camera lens characteristic.

That is, the projection optical system 2 of this embodiment needs to have different characteristics in the y and x directions. A general coaxial rotational symmetrical optical system cannot have such characteristics, but an off-axial optical system can easily have such characteristics.

Referring to FIGS. 5 and 6, the projection optical system 2 is comprised of the rotational symmetrical refractive lens group LG, the optical scanning unit MM which also serves as a stop, and four reflecting surfaces, namely a concave mirror or reflecting surface R1, concave mirror or reflecting surface R2, concave mirror or reflecting surface R3, and concave mirror or reflecting surface R4, which are arranged in the order in which a ray from the optical modulation unit T passes therethrough. All the reflecting surfaces are symmetrical only with respect to the Y-Z plane. That is, each reflecting surface is a rotational asymmetrical surface. A light beam is formed into an intermediate image between the concave mirror R1 and the concave mirror R2, and a pupil image is formed near the concave mirror R3.

The optical effects of this embodiment will be described next. Three color light beams, i.e., red, green, and blue light beams, modulated by the optical modulation unit T are combined on a single optical axis by a color combining optical system (not shown). As the color combining optical system, a dichroic prism, optical wedge, or the like can be used.

The color-combined light passes through the rotational symmetrical refractive lens group LG and is reflected by the optical scanning unit MM. This light is sequentially reflected and enlarged by the four reflecting surfaces R1 to R4. As a consequence, a one-dimensional image is displayed on the screen S. Scanning is then performed by the optical scanning unit MM which is swung/driven by the drive circuit DR to display a two-dimensional image on the screen S.

Figure 7:
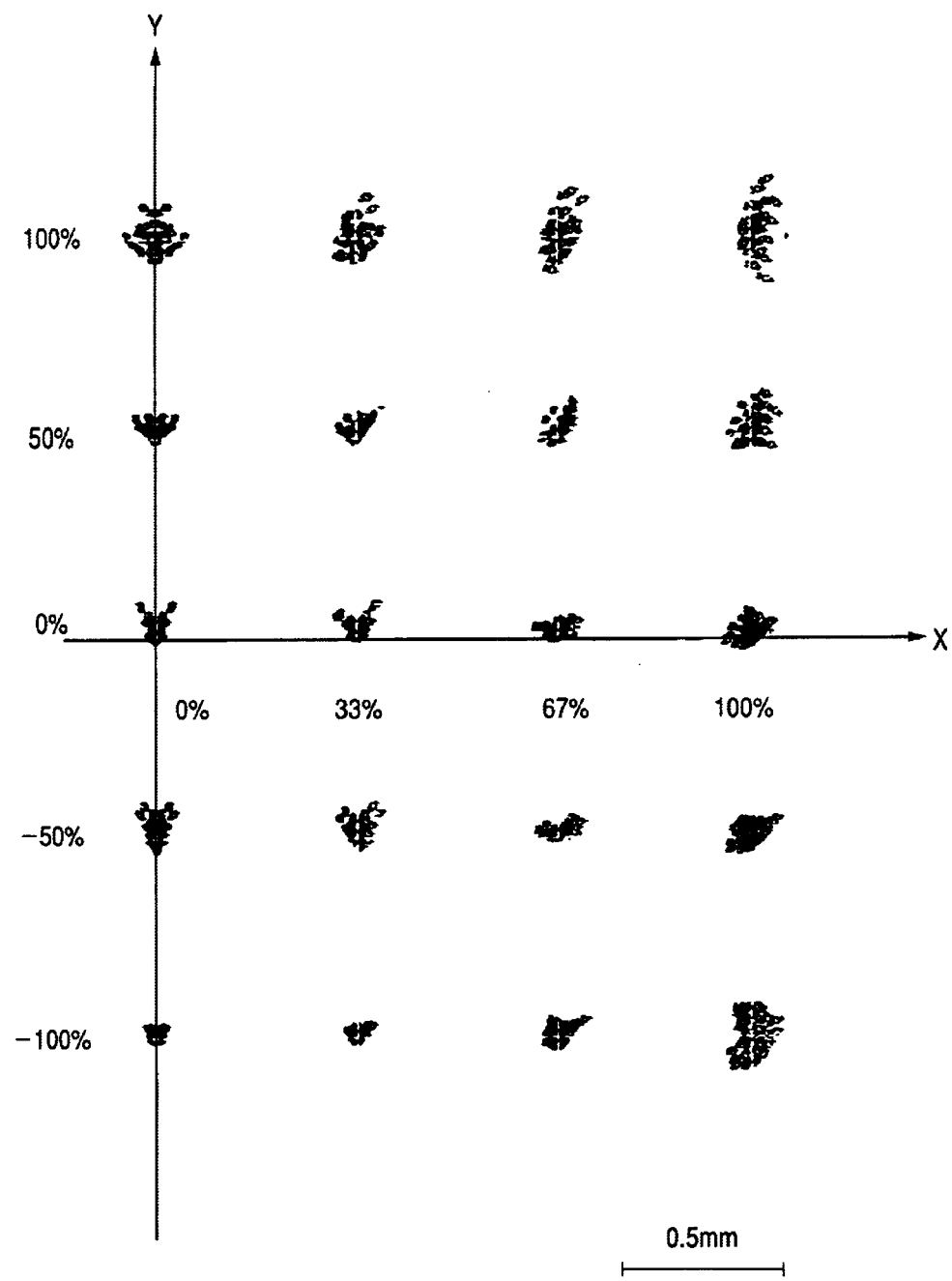
FIG. 7 is a view showing the sizes of spots on a screen which are projected by the image projection apparatus according to the second embodiment.

FIG. 7 shows the sizes of spots on the screen S. More specifically, FIG. 7 shows the spots at the positions obtained by dividing the image height in the positive x direction by four into 0%, 33%, 67%, and 100% and also dividing the image height in the y direction by five into −100%, −50%, 0%, 50%, and 100%, i.e., 20 positions on the screen S, with the center of the screen S being the origin. Note that an illustration of spots in the negative x direction is omitted from FIG. 7 because this arrangement is symmetrical with respect to the Y-Z plane of the screen.

Figure 8:
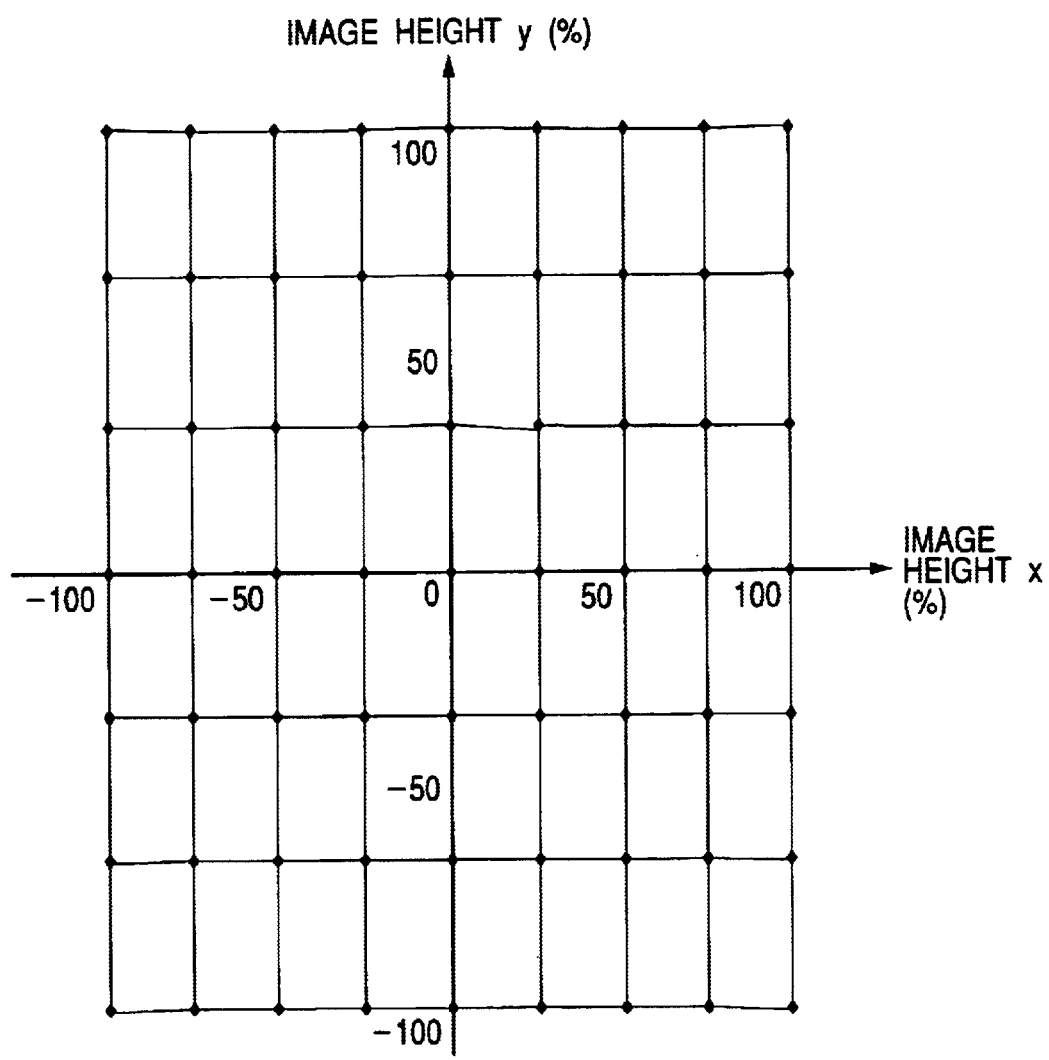
FIG. 8 is a view showing distortion in the projection optical system according to the second embodiment.

FIG. 8 shows the state of distortion in the projection optical system 2 according to this embodiment. As is obvious from FIG. 8, slight distortion is seen near image heights of −100% and 100% in the y direction, image heights of 33% to −33% in the x direction, and an image height of 50% in the y direction, but there is no large distortion as a whole, and only little asymmetrical distortion is seen.

In the projection optical system 2 used in this embodiment, when a light beam from the center of the optical modulation unit T is formed into an image on the center of the screen S, focal lengths f2(0) and f2(90) at azimuths of 0° and 90°, front-side principal points H2(0) and H2(90) with respect to the stop plane, and magnifications $\beta2(0)$ and $\beta2(90)$ at azimuths of 0° (scanning direction) and 90° (non-scanning direction) around the reference axis respectively become:

$f2(0) = -6.33205$, $f2(90) = -3.79933$ $H2(0) = -11.4305$, $H2(90) = -9.49355$ $\beta2(0) = f2(0)/(f2(0)-5.985-H2(0)) = 7.14$ $\beta2(90) = f2(90)/(f2(90)-5.985-H2(90)) = 13.07$ Therefore, $|1-\beta2(0)/(\beta2(90) \times \cos(60°))| = 0.093 < 0.3$ ... (1)

(where 60° is the angle defined by the normal to the screen S and the reference axis.)

In this manner, since the value of expression (1) is smaller than 0.3, the aspect ratio of a two-dimensional projected image on the screen S is maintained.

In this embodiment as well, the rotational asymmetrical reflecting surface is used as an upper reflecting surface. However, an optical block having a rotational asymmetrical reflecting surface formed on the surface of a transparent member may be used. Alternatively, a plurality of rotational asymmetrical upper reflecting surfaces may be integrally molded.

In this embodiment, the four rotational asymmetrical reflecting surfaces are used. However, the number of reflecting surfaces is not limited to four. In consideration of aberration correction, however, at least three reflecting surfaces are preferably used. In addition, each rotational asymmetrical reflecting surface is symmetrical with respect to a given plane. However, the present invention is not limited to this.

The projection optical system 2 in this embodiment has an f-θ lens characteristic in the scanning direction of the optical scanning unit MM. However, this system may have other characteristics. If the optical scanning unit can be swung at a constant angular velocity, it suffices if the unit has an f-θ lens characteristic in the scanning direction of the projection optical system. If, however, the optical scanning unit scans while causing sine-wave vibration, the unit needs to have an arc sine lens characteristic in the scanning direction of the projection optical system. In addition, angle changes of sine-wave vibrations of the optical scanning unit excluding small peak values may be used for optical scanning.

(Third Embodiment)

Figure 9:
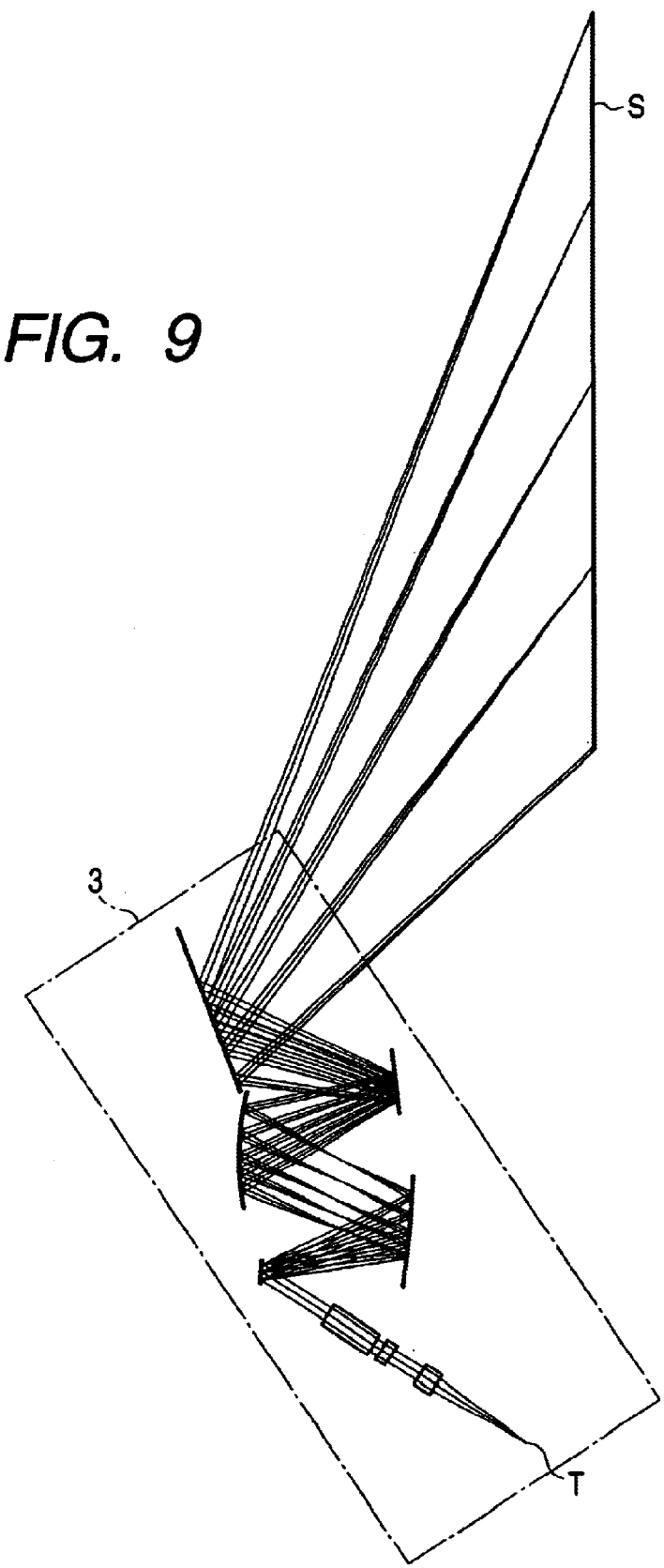
FIG. 9 is a view showing the arrangement of an image projection apparatus according to the third embodiment of the present invention.

FIG. 9 shows the arrangement of an image projection apparatus according to the third embodiment of the present invention. Referring to FIG. 9, as an optical modulation unit T having a point light source, a self-emission device which can modulate an emission intensity of a light-emission diode, semiconductor laser, or the like can be used. Instead of such a self-emission device, a unit including a light valve using a dot matrix liquid crystal panel or mirror device and a lighting system for causing illumination light strike the light valve may be used.

Figure 10:
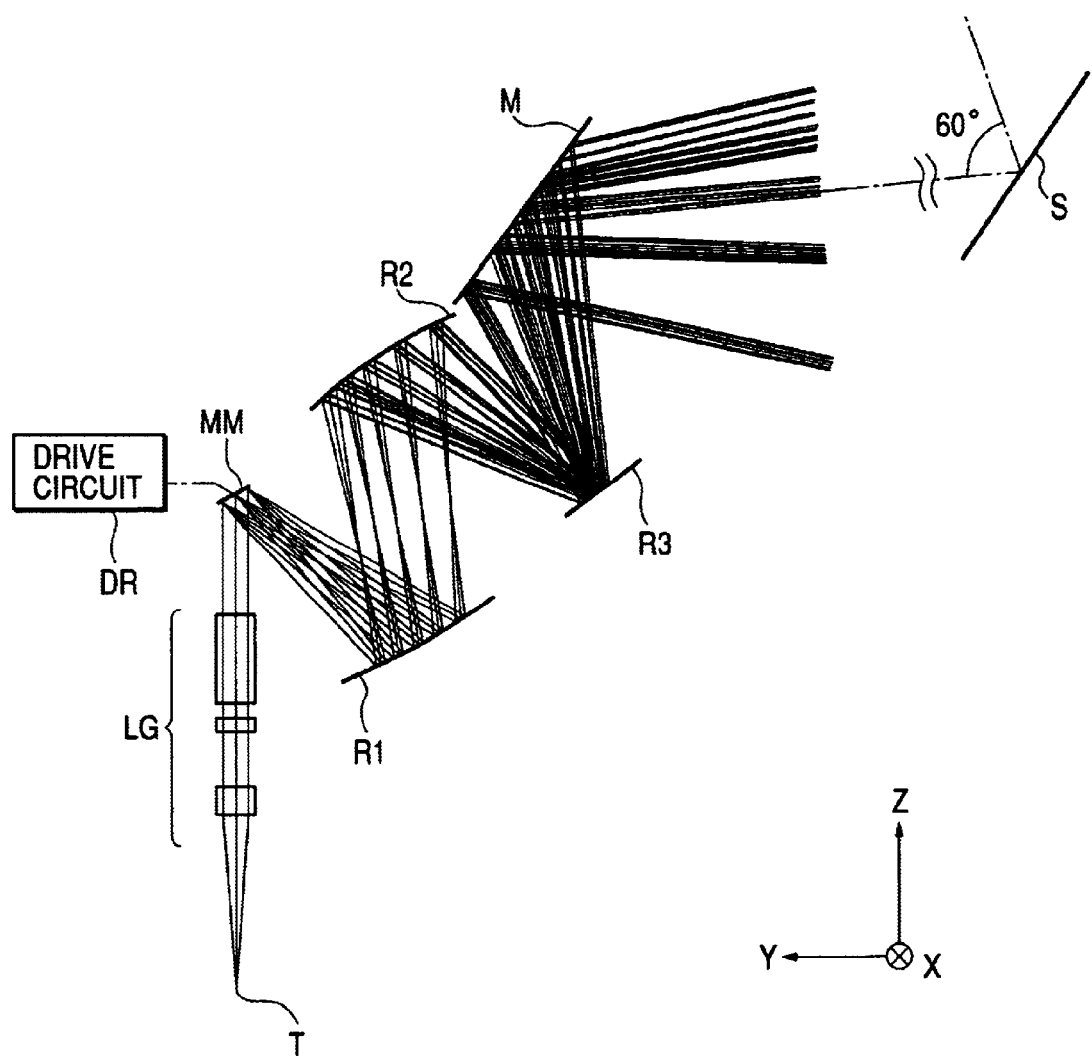
FIG. 10 is an enlarged view of a projection optical system used in the image projection apparatus according to the third embodiment.

A projection optical system 3 is used to enlarge/project an image formed by the optical modulation unit T onto a screen (projected surface) S. FIG. 10 shows the arrangement of this system in more detail.

The projection optical system 3 includes a refractive lens group LG and an optical scanning unit MM such as a galvano mirror or rotating polyhedral mirror, which also serves as a stop. In addition, the scanning direction of the optical scanning unit MM includes two orthogonal directions. This optical system includes a plane mirror M.

The screen S has an aspect ratio of 4:3 and a diagonal of 50 mm. The reference axis of the projection optical system 3 is inclined at 60° with respect to the normal to the screen S. The following are the constituent data of the projection optical system 3 used in this embodiment.

| | | | Fno 8 | | | | |
|---|---|---|---|---|---|---|---|
| i | Yi | Zi | θ | Di | Ni | νi | |
| 0 | 0.00 | 0.00 | 0.00 | 7.00 | 1 | | Optical modulation unit |
| 1 | 0.00 | 0.00 | 0.00 | 1.02 | 1.60524 | 60.64 | Refracting surface |
| 2 | 0.00 | 1.02 | 0.00 | 1.88 | 1 | | Refracting surface |
| 3 | 0.00 | 2.90 | 0.00 | 0.50 | 1.85415 | 23.78 | Refracting surface |
| 4 | 0.00 | 3.40 | 0.00 | 0.50 | 1 | | Refracting surface |
| 5 | 0.00 | 3.90 | 0.00 | 3.00 | 1.49353 | 57.40 | Refracting surface |
| 6 | 0.00 | 6.90 | 0.00 | 4.12 | 1 | | Refracting surface |
| 7 | 0.00 | 11.02 | 25.00 | 8.00 | 1 | | Optical scanning unit |
| 8 | −6.13 | 5.88 | 30.00 | 9.80 | | | Reflecting surface |
| 9 | −4.43 | 15.53 | 35.18 | 9.03 | | | Reflecting surface |
| 10 | −12.27 | 11.06 | 37.35 | 10.00 | | | Reflecting surface |
| 11 | −9.79 | 20.75 | 54.24 | 40.00 | | | Reflecting surface |
| 12 | −49.69 | 23.63 | 34.13 | | | | Image plane |

Spherical Surface Shape

Surface R1 r1=7.431

Surface R2 r2=−5.135

Surface R3 r3=−5.000

Surface R4 r4=−32.274

Surface R5 r5=8.037

Surface R6 r6=−7.745

| Aspherical Surface Shape | | | |
|---|---|---|---|
| Surface R8 | C02 = 2.22801e−002 | C20 = 9.04333e−003 | C40 = 1.71822e−004 |
| | C03 = 3.56556e−003 | C21 = 5.56881e−003 | C41 = 5.40520e−005 |
| | C04 = −1.00569e−004 | C22 = 3.21617e−004 | C42 = −2.73092e−005 |
| | C05 = −7.15306e−005 | C23 = −1.91534e−004 | |
| | C06 = −8.43248e−006 | C24 = 1.63498e−005 | |
| | C60 = 8.46089e−006 | | |
| Surface R9 | C02 = −2.79179e−002 | C20 = −3.94843e−002 | C40 = 1.51011e−005 |
| | C03 = 2.17674e−003 | C21 = 3.81707e−003 | C41 = −1.70163e−017 |
| | C04 = −9.79316e−006 | C22 = 2.03030e−005 | C42 = −3.95443e−032 |
| | C05 = −5.36429e−020 | C23 = −2.68262e−019 | |
| | C06 = −3.99041e−033 | C24 = −3.95443e−032 | |
| | C60 = −3.77454e−033 | | |

-continued

Aspherical Surface Shape

| Surface R10 | C02 = 1.29299e−002 | C20 = 1.87452e−002 | C40 = 2.21569e−006 |
|---|---|---|---|
| | C03 = 1.13796e−003 | C21 = −1.06388e−003 | C41 = −2.72786e−017 |
| | C04 = −2.68164e−004 | C22 = 3.86440e−004 | C42 = −3.99041e−029 |
| | C05 = −3.31658e−018 | C23 = −5.40392e−017 | |
| | C06 = −3.97692e−030 | C24 = −3.99041e−029 | |
| | C60 = −3.99041e−030 | | |

Assume that the center of the screen S is the origin and a ray is formed into an image on the center of screen at an angle of 0°. In this case, when the image height on the screen S in the y direction is −100%, −50%, 0%, 50%, and 100%, deflection angle of the optical scanning unit MM becomes 5.33, 2.66, 0, −2.63, and −5.08, respectively. Likewise, assume that a ray is formed into an image on the center of screen at an angle of 0°. In this case, when the image height on the screen S in the x direction is 0%, 33%, 67%, and 100%, deflection angle of the optical scanning unit MM becomes 0, −2.05, −4.1, 2, and −6.21, respectively. The positive and negative signs of angles conform to the tilt angles of the reflecting surfaces.

Referring to FIGS. 9 and 10, the projection optical system 3 is comprised of the rotational symmetrical refractive lens group LG, the optical scanning unit MM which also serves as a stop, three reflecting surfaces, namely a concave mirror or reflecting surface R1, concave mirror or reflecting surface R2, and concave mirror or reflecting surface R3, and a return mirror M, which are arranged in the order in which a ray from the optical modulation unit T passes therethrough. All the reflecting surfaces are symmetrical only with respect to the Y-Z plane. That is, each reflecting surface is a rotational asymmetrical surface. A light beam is formed into an intermediate image between the concave mirror R1 and the concave mirror R2, and a pupil image is formed near the concave mirror R3.

The optical effects of this embodiment will be described next. Three color light beams, i.e., red, green, and blue light beams, modulated by the optical modulation unit T are combined on a single optical axis by a color combining optical system (not shown). As the color combining optical system, a dichroic prism, optical wedge, or the like can be used.

The color-combined light passes through the rotational symmetrical refractive lens group LG and is reflected by the optical scanning unit MM. This light is sequentially reflected by the three reflecting surfaces R1 to R3 to form a point image on the screen S. When the optical scanning unit MM is scanned in two directions by the drive circuit DR, a two-dimensional image is displayed on the screen S.

Figure 11:
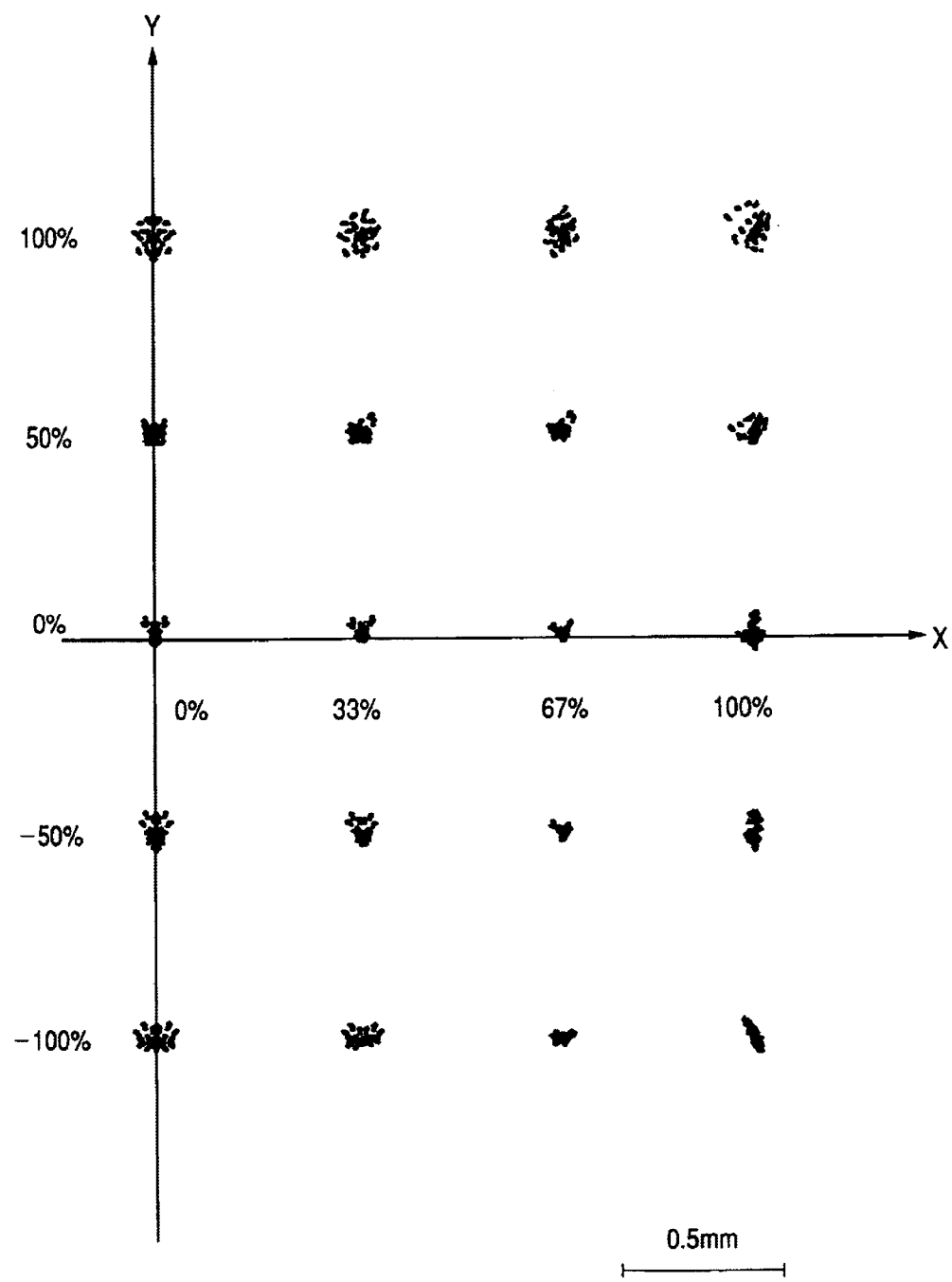
FIG. 11 is a view showing the sizes of spots on a screen which are projected by the image projection apparatus according to the third embodiment.

FIG. 11 shows the sizes of spots on the screen S. More specifically, FIG. 11 shows the spots at the positions obtained by dividing the image height in the positive x direction by four into 0%, 33%, 67%, and 100% and also dividing the image height in the y direction by five into −100%, −50%, 0%, 50%, and 100%, i.e., 20 positions on the screen S, with the center of the screen S being the origin. Note that an illustration of spots in the negative x direction is omitted from FIG. 11 because this arrangement is symmetrical with respect to the Y-Z plane of the screen.

Figure 12:
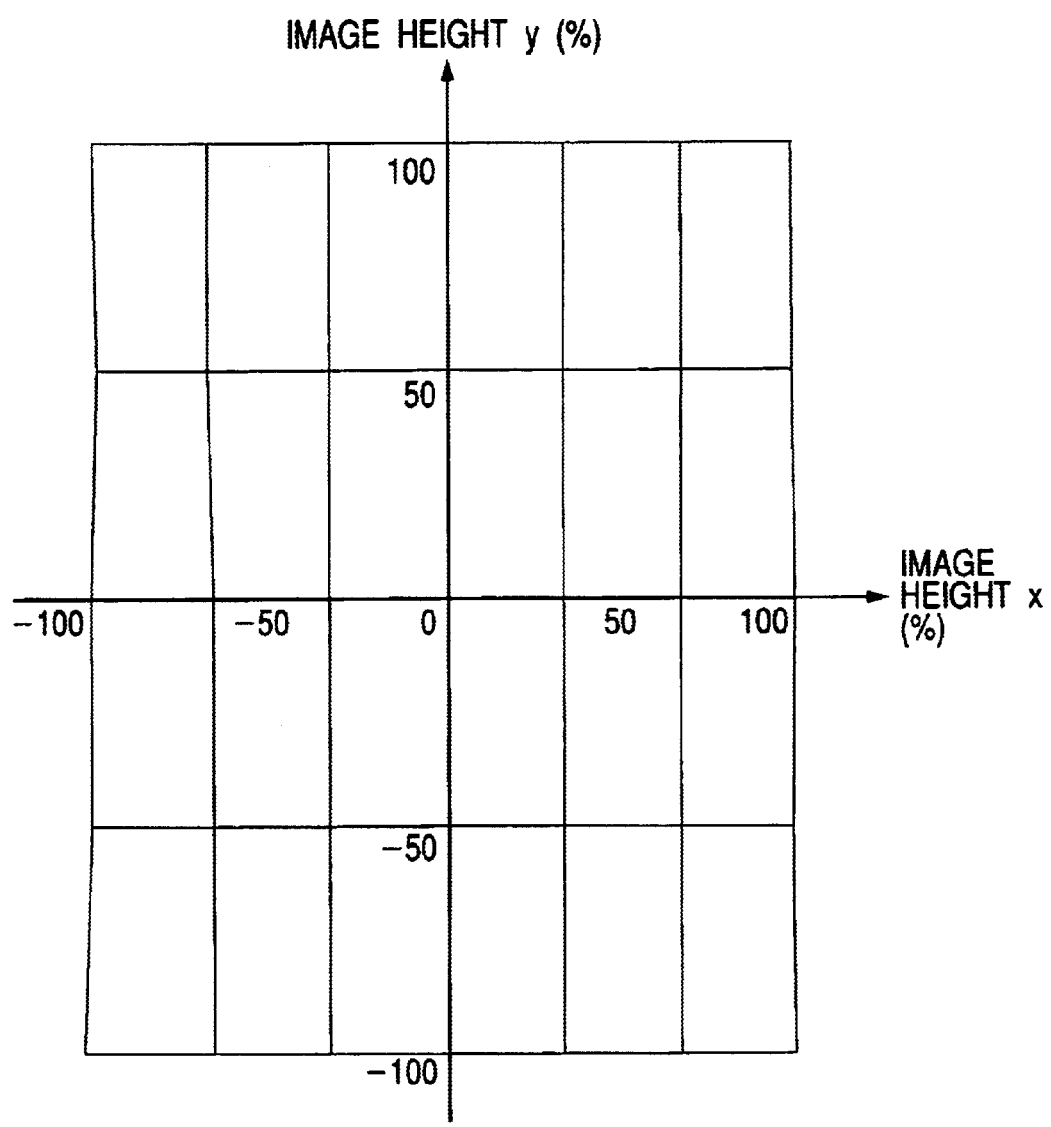
FIG. 12 is a view showing distortion in the projection optical system according to the third embodiment.
Figure 13:
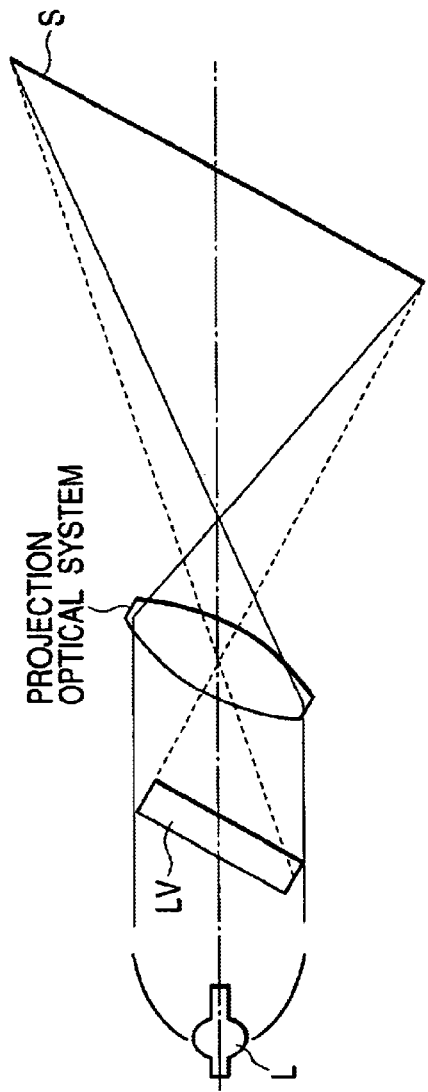
FIG. 13 is a conceptual view of a conventional shift optical system.
Figure 14:
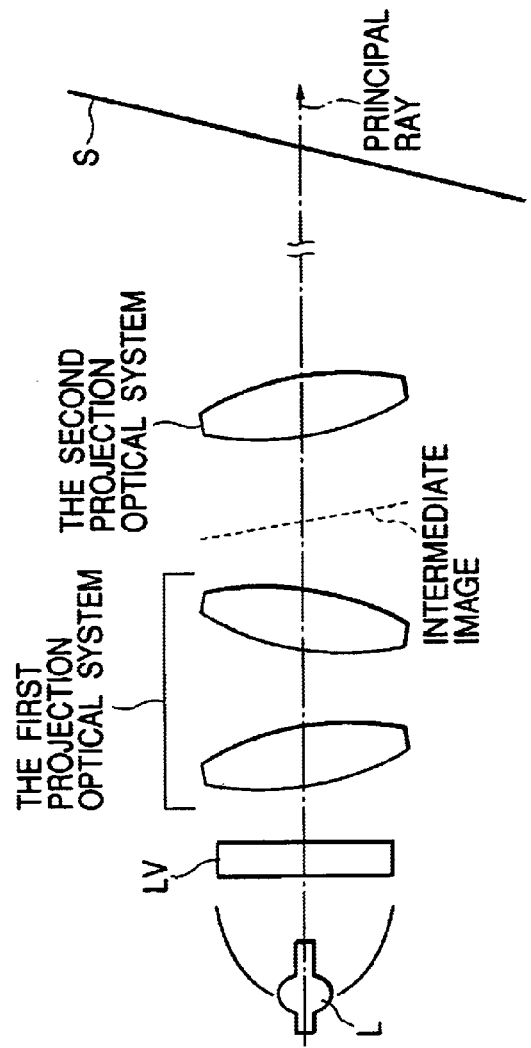
FIG. 14 is a conceptual view of an oblique projection optical system.
Figure 15:
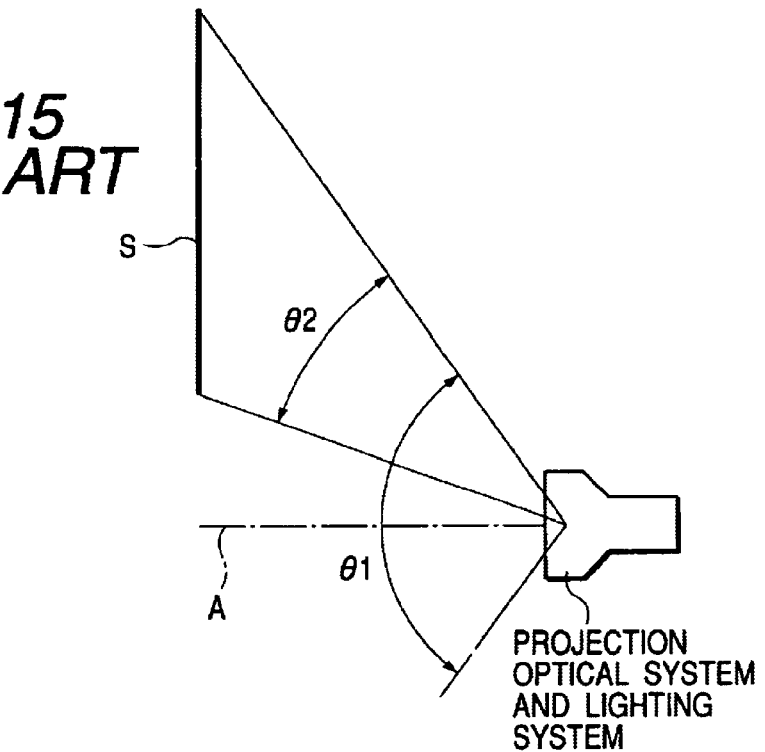
FIG. 15 is a view showing a conventional oblique projection optical system.

FIG. 12 shows the state of distortion in the projection optical system 3 according to this embodiment. As is obvious from FIG. 12, slight distortion is seen near image heights of −100% and 100% in the x direction and image heights of 0% to 100% in the y direction, but there is no large distortion as a whole, and only little asymmetrical distortion is seen.

In the projection optical system 3 used in this embodiment, when a light beam from the center of the optical modulation unit T is formed into an image on the center of the screen S, focal lengths f3(0) and f3(90) at azimuths of 0° and 90°, front-side principal points H3(0) and H3(90) with respect to the stop plane, and magnifications β3(0) and β3(90) at azimuths of 0° (scanning direction) and 90° (non-scanning direction) around the reference axis respectively become:

$f3(0)=-5.25468, f3(90)=-3.54649$ $H3(0)=-11.7153, H3(90)=-10.313$ $β3(0)=f3(0)/(f3(0)-6.996-H3(0))=9.81$ $β3(90)=f3(90)/(f3(90)-6.996-H3(90))=15.45$

Therefore, $|1-3(0)/(β3(90)×\cos(60°))|=0.27<0.3$  ... (1)

(where 60° is the angle defined by the normal to the screen S and the reference axis.)

In this manner, since the value of expression (1) is smaller than 0.3, the aspect ratio of a two-dimensional projected image on the screen S is maintained.

The reason why the value of expression (1) is considerably large as compared with the other embodiments described above is that the deflection angles of the optical scanning unit MM in the two directions are asymmetrical to correct aberrations such as distortion.

In this embodiment as well, the rotational asymmetrical reflecting surface is used as an upper reflecting surface. However, an optical block having a rotational asymmetrical reflecting surface form on the surface of a transparent member may be used. Alternatively, a plurality of rotational asymmetrical upper reflecting surfaces may be integrally molded.

In this embodiment, the three rotational asymmetrical reflecting surfaces are used. However, the number of reflecting surfaces is not limited to four. In consideration of aberration correction, however, at least three reflecting surfaces are preferably used. In addition, each rotational asymmetrical reflecting surface is symmetrical with respect to a given plane. However, the present invention is not limited to this.

Each embodiment described above has exemplified the projection optical system in which the optical modulation unit T is placed on the near conjugate plane, and an image on the conjugate plane is enlarged and projected on the screen S serving as the far conjugate plane. However, the present invention may be applied to an image pickup optical system such as a visual presenter which picks up a two-dimensional object placed on the far conjugate plane by using an image pickup element (photoelectric conversion element) such as a CCD or CMOS placed on the near conjugate plane.

In this case, by satisfying expression (1), the aspect ratio of the pickup image can be maintained properly.

As has been described above, according to each embodiment, by setting the focal distances, magnifications, and the like around the reference axis to proper values, even an oblique projection optical system can be obtained, which attains a reduction in size and suppresses distortion (mainly trapezoidal distortion).

By using an off-axial optical system having rotational asymmetrical surfaces as curved reflecting surfaces, in particular, characteristics that are asymmetrical with respect to an optical axis can be easily be obtained. This allows the optical system to have the same f·tanθ characteristic as that of a general camera lens in the non-scanning direction of the optical scanning means and have the characteristic of an f–θ lens, arc sine lens, or the like in the scanning direction in accordance with the optical scanning means. This makes it possible to effectively correct distortion.

What is claimed is:

1. An image projection apparatus comprising:
    an optical modulation unit for modulating light and emitting the modulated light;
    a projection optical system for projecting an image of the optical modulation unit onto a projected plane, the projection optical system including a plurality of curved reflecting surfaces, wherein the plurality of curved reflecting surfaces includes two concave reflecting surfaces; and
    an optical scanning unit for scanning the projected plane with the light modulated by the optical modulation unit, the optical scanning unit disposed between the optical modulation unit, wherein the optical scanning unit is driven to rotate or swing;
    wherein the image projection apparatus scans the projected plane with the modulated light by the optical scanning unit, thereby forms a two-dimensional image on the projected plane;
    wherein the projection optical system forms an intermediate image of the optical modulation unit between two curved reflecting surfaces among the plurality of curved reflecting surface and forms the intermediate image on the projected plane again; and
    wherein an optical path of a ray connecting a center of said two-dimensional image and a center of a pupil of said projection optical system is inclined with respect to said projected plane.

2. An image projection apparatus according to claim 1, wherein said projected plane is scanned with said modulated light by rotating or swinging said optical scanning unit.

3. An image projection apparatus according to claim 1, wherein said plurality of curved reflecting surfaces are rotational asymmetrical surfaces.

4. An image projection apparatus according to claim 1, wherein a curved reflecting surface after said intermediate image is a concave surface.

5. An image projection apparatus according to claim 1, wherein a curved reflecting surface before said intermediate image is a concave surface.

6. An image projection apparatus according to claim 1, wherein a curved reflecting surface after said intermediate image is a convex surface.

7. An image projection apparatus according to claim 1, wherein said projected plane is one-dimensionally scanned with said modulated light.

8. An image projection apparatus according to claim 1, wherein said projected plane is two-dimensionally scanned with said modulated light.

9. An image projection apparatus according to claim 1, wherein said optical modulation unit changes intensity of said modulated light.

10. An image projection apparatus according to claim 1, wherein said optical scanning unit comprises a galvano mirror or a rotational polyhedral mirror.

11. An image projection apparatus comprising:
    an optical modulation unit for emitting modulated point light;
    a projection optical system for projecting an image of the optical modulation unit onto a projected plane, the projection optical system including a plurality of curved reflecting surfaces, wherein the plurality of curved reflecting surfaces includes two concave reflecting surfaces;
    a refractive lens unit for guiding the light emitted from the optical modulation unit to the projection optical system; and
    an optical scanning unit for two-dimensionally scanning the projected plane with the light modulated by the optical modulation unit, the optical scanning unit disposed between the refractive lens unit and the projection optical system;
    wherein the image projection apparatus scans the projected plane with the modulated light by the optical scanning unit, thereby forms a two-dimensional image;
    wherein the projection optical system forms an intermediate image of the optical modulation unit between two reflecting surfaces among the plurality of curved reflecting surfaces; and
    wherein the modulated light emitted from the projection optical system is projected obliquely onto the projected plane.

12. An image projection apparatus according to claim 11, wherein in the projection optical system, a reflecting surface disposed closest to the optical scanning unit and a reflecting surface disposed second closest to the optical scanning unit on an optical path of the light emitted from the optical scanning unit are concave reflecting surfaces.

* * * * *